US011784318B2

(12) United States Patent
Barde et al.

(10) Patent No.: US 11,784,318 B2
(45) Date of Patent: Oct. 10, 2023

(54) 3D ORDERED NANOMESH FOR METAL-AIR BATTERY

(71) Applicants: Toyota Motor Europe, Brussels (BE); IMEC VZW, Leuven (BE); KATHOLIEKE UNIVERSITEIT LEUVEN, Leuven (BE)

(72) Inventors: Fanny Jeanne Julie Barde, Brussels (BE); Philippe Vereecken, Leuven (BE); Yongho Kee, Leuven (BE)

(73) Assignees: TOYOTA MOTOR EUROPE, Brussels (BE); IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 7 days.

(21) Appl. No.: 17/442,874

(22) PCT Filed: Apr. 1, 2019

(86) PCT No.: PCT/EP2019/058194
§ 371 (c)(1),
(2) Date: Sep. 24, 2021

(87) PCT Pub. No.: WO2020/200416
PCT Pub. Date: Oct. 8, 2020

(65) Prior Publication Data
US 2022/0190352 A1   Jun. 16, 2022

(51) Int. Cl.
*H01M 4/74* (2006.01)
*H01M 4/88* (2006.01)
*H01M 4/86* (2006.01)

(52) U.S. Cl.
CPC ....... *H01M 4/8817* (2013.01); *H01M 4/8803* (2013.01); *H01M 2004/8689* (2013.01)

(58) Field of Classification Search
None
See application file for complete search history.

(56) References Cited

U.S. PATENT DOCUMENTS

| 4,980,037 A | 12/1990 | Hossain et al. |
| 2011/0104576 A1* | 5/2011 | Johnson ................ H01M 4/131 429/405 |
| 2017/0012332 A1 | 1/2017 | Lee et al. |

FOREIGN PATENT DOCUMENTS

| CN | 108 292 759 A | 7/2018 |
| KR | 20160062617 A | 6/2016 |
| WO | 2019/045545 A1 | 3/2019 |

OTHER PUBLICATIONS

English translation of KR20160062617A to Lee et al. (Year: 2016).*
(Continued)

*Primary Examiner* — Lucas J. O'Donnell
(74) *Attorney, Agent, or Firm* — Dinsmore & Shohl LLP

(57) ABSTRACT

A method (100) for making a non-aqueous rechargeable metal-air battery is provided. The method includes before and/or after inserting (108) a cathode in the battery, a pre-conditioning step (104, 106, 110) of a 3D nanomesh structure, so as to obtain a pre-conditioned 3D nanomesh structure, the pre-conditioned 3D nanomesh structure being free of cathode active material.

A cathode to be inserted into a non-aqueous rechargeable metal-air battery is also provided. The cathode includes a pre-conditioned 3D nanomesh structure made of nanowires made of electronic conductive metal material, the pre-conditioned 3D nanomesh structure being free of cathode active material.

A non-aqueous rechargeable metal-air battery including such a cathode is also provided.

15 Claims, 10 Drawing Sheets

(56) References Cited

OTHER PUBLICATIONS

Stanislaw P. Zankowski et al: "Combining High Porosity with High Surface Area in Flexible Interconnected Nanowire Meshes for Hydrogen Generation and Beyond", ACS Applied Materials & Interfaces, vol. 10, No. 51, Dec. 26, 2018 (Dec. 26, 2018), pp. 44634-44644, XP055637263,us ISSN: 1944-8244, DOI: 10.1021/acsami.8b15888 pp. S-8-pp. S-4.

\* cited by examiner

FIG.7A
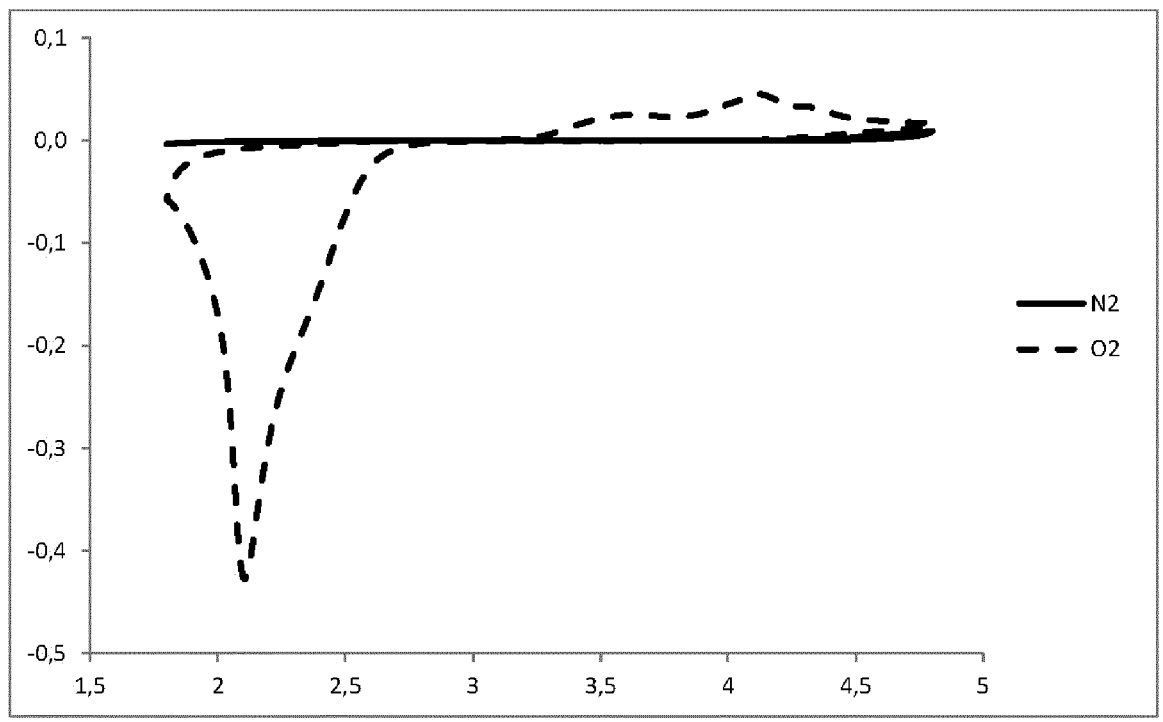
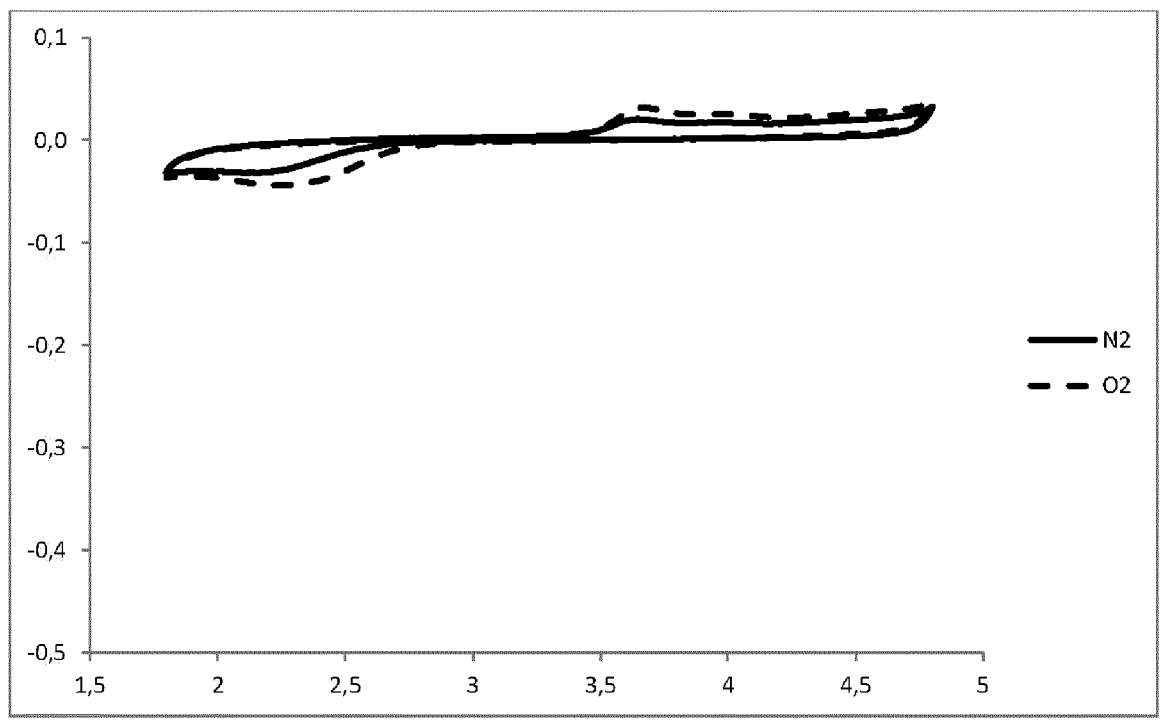
FIG.7B

FIG.9A
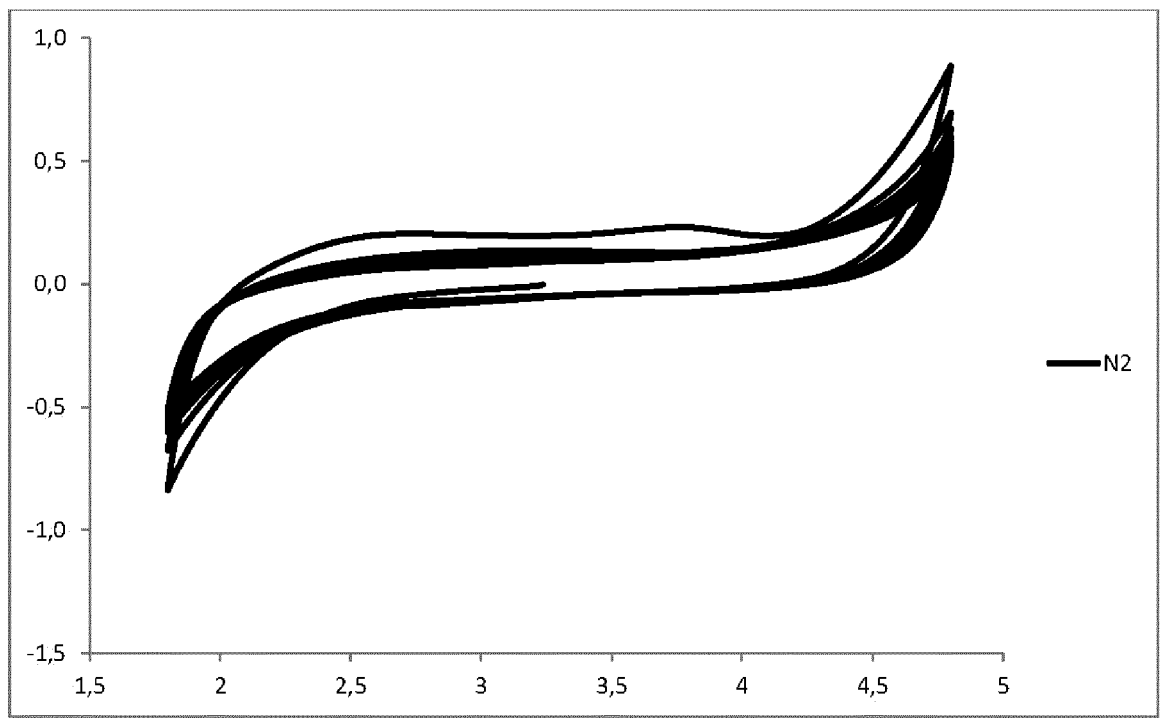
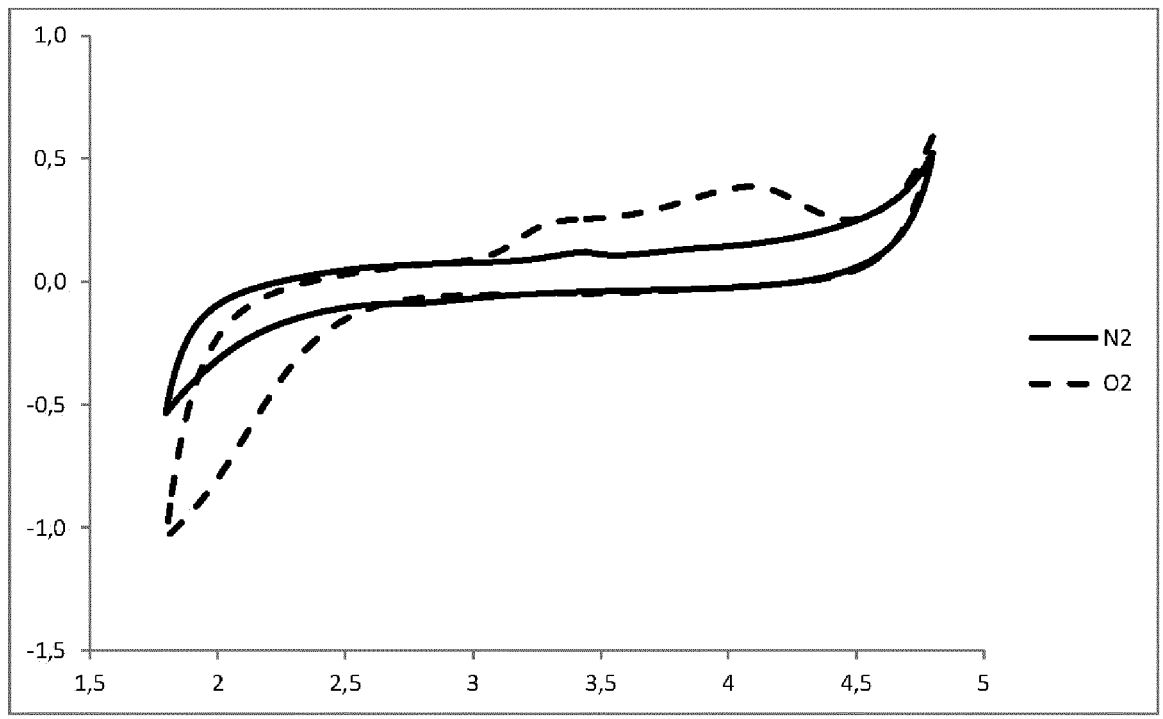
FIG.9B

FIG.14
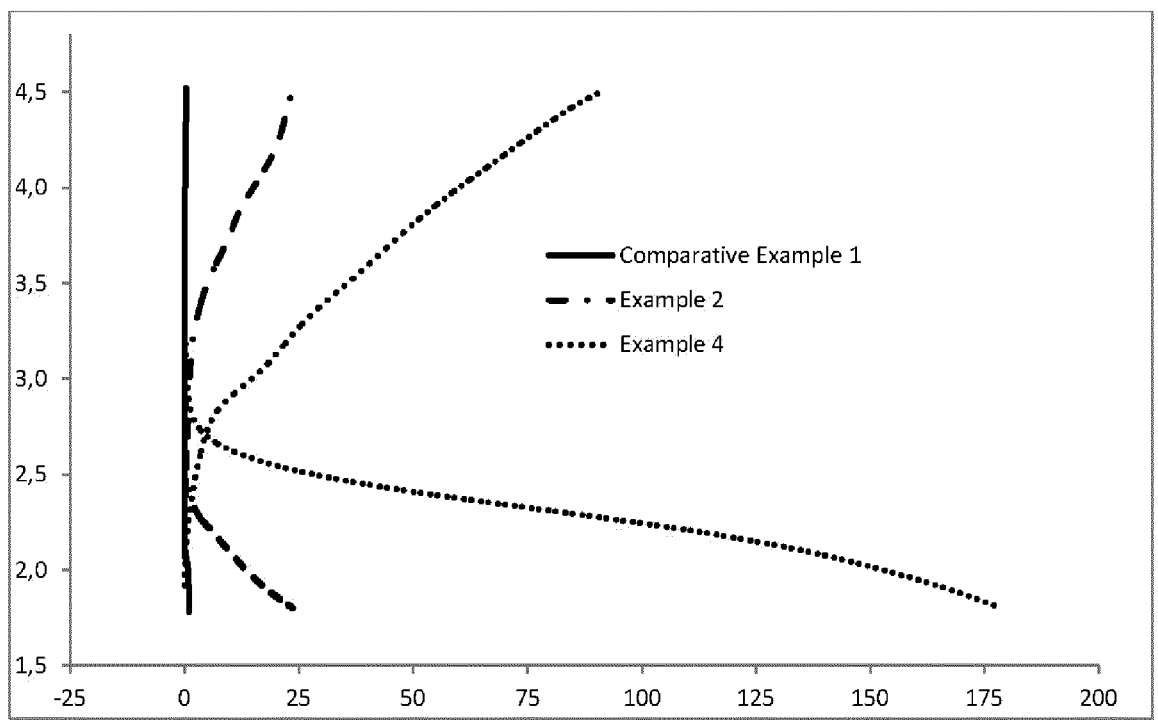
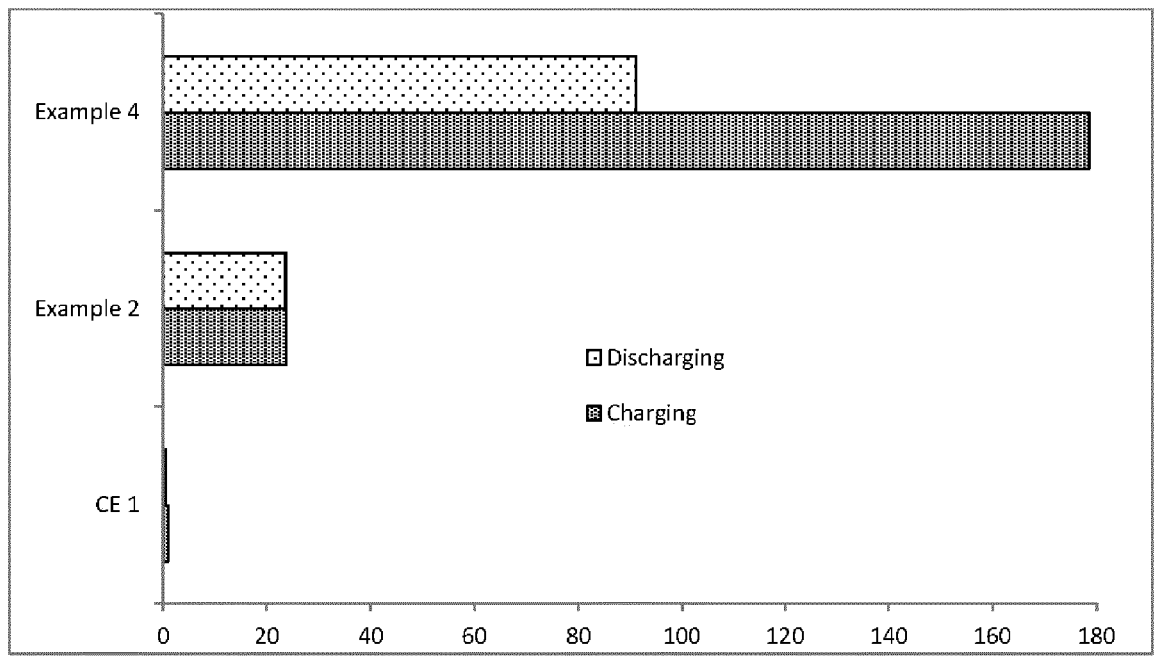
FIG.15

3D ORDERED NANOMESH FOR METAL-AIR BATTERY

CROSS-REFERENCE TO RELATED APPLICATION

This application is a national phase of International Application No. PCT/EP2019/058194 filed on Apr. 1, 2019, the entire contents of which are herein incorporated by reference.

TECHNICAL FIELD

The present disclosure is related to rechargeable non-aqueous metal-air/metal-oxygen battery, and more particularly to current collector in a metal-air/metal-oxygen battery, such as a lithium-air, sodium-air, magnesium-air, aluminium-air, zinc-air, tin-air or silicon-air battery.

BACKGROUND

In recent years, with the rapid spread of information-related devices and communication devices such as personal computers, camcorders and cellular phones, it has become important to develop a battery for use as a power source for such devices. In the automobile industry, the development of high-power and high-capacity batteries for electric vehicles and hybrid vehicles has been promoted. Among various kinds of batteries, rechargeable lithium batteries have attracted attention due to their high energy density and high power.

Especially, rechargeable lithium-air batteries have attracted attention as a rechargeable lithium battery for electric vehicles and hybrid vehicles, which is required to have high energy density. Rechargeable lithium-air batteries use oxygen from the air as a cathode active material. Therefore, compared to conventional lithium rechargeable batteries containing a transition metal oxide (e.g., lithium cobaltate, NMC, NCA . . . ) as a cathode active material, rechargeable lithium-air batteries are able to have larger capacity.

In metal-air batteries, the cathode active material, oxygen, is not contained within the battery. Instead, this material is provided by the surrounding atmosphere. Naturally, such a system allows in principle a very high specific energy (energy provided by the battery per unit weight, typically given in Wh/kg in this technical field—Watt-hour per kilogram). In such batteries, oxygen may be partially reduced to peroxide, or fully reduced to hydroxide or oxide depending on the catalyst, electrolyte, availability of oxygen etc. When the negative electrode (anode) is lithium (Li), lithium peroxide ($Li_2O_2$) or lithium oxide ($Li_2O$) may be formed.

A metal-air battery may be schematically represented in FIG. 1. It contains mainly the following parts:
- metal anode (for example Li),
- non-aqueous electrolyte,
- air cathode (for example $O_2$ cathode) most commonly and usually based on carbon (but other cathode materials are known in this context), binder and sometimes catalyst.

The ideal reactions during the use of such a battery should be as follows:
Upon discharge:
At anode: 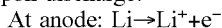
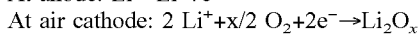
Upon charge:
At anode: 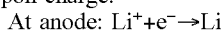
At air cathode: 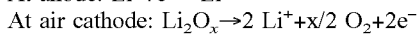

In the reaction which occurs in the air cathode upon discharge, the lithium ion ($Li^+$) is dissolved from the anode by electrochemical oxidation and transferred to the air cathode through an electrolyte. The oxygen ($O_2$) is supplied to the air cathode.

Nevertheless, during electrochemical processes of the battery, it may happen that the $O_2$ or $O_2$-derived species react with the solvent molecules of the electrolyte, which may lead to the formation of side reaction products such as $Li_2CO_3$, Li formate, Li acetate etc. These products are not desirable in the battery and are believed to reduce the metal-air battery performance.

These side-reactions may lead to poor re-chargeability of the system and poor capacity retention. These general problems may be illustrated schematically as shown in FIGS. 2 and 3.

The problems shown schematically in FIGS. 2 and 3 may be summarized as follows:
Problem 1: Low initial capacity. This is a problem for both primary and secondary (rechargeable) metal-air non-aqueous batteries.
Problem 2: Low efficiency of system, characterized by a large voltage gap between charge and discharge voltages. This is only an issue for secondary metal-air non-aqueous batteries subjected to charging and discharging cycles.
Problem 3: Poor capacity retention, which leads to bad cyclability of the system and a low number of cycles because the capacity drops rapidly. This also is only an issue for secondary metal-air non-aqueous batteries.

Concerning the air cathode, in a conventional lithium-air battery, the air cathode often includes a metal grid (made from nickel, aluminum, stainless steel, or titanium for example) as an air cathode current collector, upon which an air cathode material is supported, the air cathode material comprising a conductive material such as particulate carbon. In an alternative embodiment described in EP 2 278 655 A1, carbon paper is used as an air cathode current collector. However, at higher currents (100 µA for example), the battery capacity decreases strongly and the hysteresis increases strongly (due to a combination of a lower discharge potential and a higher charge potential). Problems 1 and 2 of those set out above thus remain to be solved.

In WO 2013/139370, a lithium ion battery, which is a closed battery system, is disclosed which contains at least two carbon foam electrodes. Lithium air batteries containing carbon foam-based electrodes are not taught in this reference, and no means for modifying carbon foam substrates are disclosed.

SUMMARY

Currently, it remains desirable to solve the above-cited problems.

In one aspect, the present disclosure relates to a method for making a non-aqueous rechargeable metal-air battery.

Therefore, according to embodiments of the present disclosure, a method for making a non-aqueous rechargeable metal-air battery is provided.

The method includes:
- making a cathode comprising a 3D nanomesh structure made of electronic conductive metal material;
- inserting the cathode in the battery;
- charging/discharging the battery so as to form the cathode active material on a pre-conditioned 3D nanomesh structure;

wherein, before and/or after inserting the cathode in the battery, a pre-conditioning step of the 3D nanomesh structure is carried out, so as to obtain the pre-conditioned 3D nanomesh structure, the pre-conditioned 3D nanomesh structure being free of cathode active material.

By providing such a pre-conditioning step of the cathode before and/or after inserting the cathode in the battery, the pre-conditioned 3D nanomesh structure is obtained, the pre-conditioned 3D nanomesh structure being free of cathode active material.

As the cathode comprises a pre-conditioned 3D nanomesh structure, it is understood that the 3D nanomesh structure is treated after being produced and the pre-conditioned 3D nanomesh structure being free of cathode active material, i.e., the pre-conditioned 3D nanomesh structure is free of oxygen ($O_2$). The freshly made 3D nanomesh structure is therefore not used directly in the metal-air battery.

Thanks to the pre-conditioning step, the initial capacity of the metal-air battery is increased, the rechargeability of the metal-air battery is increased and the rate performance, i.e., the speed of discharge/charge, of the metal-air battery is increased.

It is assumed that metal hydroxide, the metal being the metal of the electronic conductive metal material with hydroxyl groups attached to the metal, such as $Ni(OH)_2$ when the electronic conductive metal material of the 3D nanomesh is nickel, is formed on the freshly made 3D nanomesh. These hydroxyl groups on the surface of the 3D nanomesh are not desirable in the battery and are believed to reduce the metal-air battery performance. in present disclosure, the metal hydroxide is not considered as oxygen, i.e., as cathode active material. Indeed, where the cathode active material is "free of oxygen"—in a sense of $O_2$ gas or "dissolved $O_2$"- or $O_2$ combined with lithium as $Li_xO_y$. In some special reports, there are possibility to be in a "hybrid" type battery, between Li-ion battery and Li—O2 battery where the cathode material is $Li_xO_yM_z$ (in embodiments, z equals zero for Li-Air system, or M being a catalyst so in small quantity in the cathode), M being a transition metal.

During the pre-conditioning step, the hydroxyl groups (OH— groups) that may have formed during the fabrication of the 3D nanomesh are at least partially removed, transformed (e.g., NiO, $Li_2O$, LiOH) and/or deactivated.

It is also to be noted that, thanks to the method, the cathode is free of inactive material such as binder. Indeed, in general, binders are unstable in presence of oxygen and therefore, upon reaction with oxygen, reduce the properties of the metal-air battery during use.

Although not specifically mentioned, it is understood that the charging/discharging step is carried out when the non-aqueous rechargeable metal-air battery is assembled, i.e., with the anode, the anode current collector and the non-aqueous electrolyte.

According to some embodiments, the content and layer thickness of hydroxyl groups may be strongly dependent upon both the AAO etching duration via alkali hydroxides (e.g., NaOH, KOH) and surface are of nickel 3D nanomesh.

For example, in a typical 3D nanomesh structure of the present disclosure, the thickness of nickel nanowire may be 40 μm on which there may be a 1 μm layer of NiO—$Ni(OH)_2$ on each side. So approximately 5% of the nanowire is composed of NiO—$Ni(OH)_2$. Of course this proportion of NiO—$Ni(OH)_2$ vs. Ni can vary depending on the experimental conditions used to prepared the 3D nanomesh structure (pH of solution used for electrodeposition . . . ).

According to some embodiments, the pre-conditioning step may be carried out after inserting the cathode in the battery by applying a formation step to the 3D nanomesh structure in the non-aqueous electrolyte to be used in the metal-air battery under an inert atmosphere.

Thanks to the formation step being carried out in an inert atmosphere, no cathode active material is deposited on the pre-conditioned 3D nanomesh structure, i.e., no cathode active material ($O_2$) is deposited on the pre-conditioned 3D nanomesh structure. In the present disclosure, it is understood that an inert atmosphere is an atmosphere that is free of oxygen ($O_2$) or water ($H_2O$). As non-limiting example, it may be argon or nitrogen ($N_2$).

During the formation step, or precycling, of the cathode in the non-aqueous rechargeable metal-air battery in presence of an inert gas, i.e., in an atmosphere free of oxygen ($O_2$), the hydroxyl groups are transformed and/or partially removed from the surface of the 3D nanomesh.

According to some embodiments, the formation step may be carried out at a voltage rate greater than or equal to 10 mV/s and smaller than or equal to 100 mV/s until the difference of current density measured between two cycles is smaller than or equal to 1 $\mu A/cm^2$ at a temperature comprised between 10° C. and 50° C., in some embodiments, at room temperature.

According to some embodiments, the number of cycles may be smaller than or equal to 15 cycles, in embodiments, smaller than or equal to 5 cycles, in embodiments, smaller than or equal to 3 cycles, in embodiments, equal to 1 cycle.

According to some embodiments, the pre-conditioning step may be carried out before inserting the cathode in the battery and comprises a drying step to the 3D nanomesh structure.

The drying step allows for loss of structural water present in the metal hydroxide. Where the 3D nanomesh structure is made of nickel or cobalt, a phase transformation from alpha to beta may also take place during the drying step for $Ni(OH)_2$ and $Co(OH)_2$. Although cobalt may be more expensive than nickel, it is still cheaper than gold or platinum or palladium.

According to some embodiments, the drying step may be carried out before inserting the cathode in the battery and the formation step after inserting the cathode in the battery.

According to some embodiments, the drying step may be carried out in air for at least 1 h at a temperature greater than or equal to 100° C., in embodiments, greater than or equal to 110° C.

Temperature greater than or equal to 100° C. allows for evaporation of free water adsorbed on the metal hydroxide and transformation of the alpha metal hydroxide to beta form, i.e., the structural water is expelled during the drying step.

According to some embodiments, the temperature may be smaller than or equal to 300° C., in embodiments, smaller than or equal to 280° C., in embodiments, smaller than or equal to 150° C.

Temperature smaller than or equal to 300° C. allows for keeping the integrity of the 3D nanomesh structure, i.e., above 300° C., there is no complete destruction/collapsing of the 3D nanomesh structure.

According to some embodiments, the pre-conditioning step may be carried out before inserting the cathode in the battery and comprises a step of conformably coating the 3D nanomesh structure with amorphous carbon, the amorphous carbon coating having a thickness smaller than or equal to 2 nm.

By conformably coating amorphous carbon onto the 3D nanomesh structure, one may deactivate the metal hydroxide on the surface of the 3D nanomesh structure.

According to some embodiments, the coating step may be carried out before inserting the cathode in the battery and the formation step after inserting the cathode in the battery.

According to some embodiments, the conformably coating step may be carried out at a temperature smaller than or equal to 300° C., in embodiments, smaller than or equal to 280° C.

Temperature smaller than or equal to 300° C. allows for keeping the integrity of the 3D nanomesh structure and for keeping the carbon amorphous, i.e., low temperature brings defects ("D" band or "sp2" hybridization disorder. Further, it is believed that oxidation resistance may depend at least partially on the relative number of surface defects or dislocations present in the graphite particles. Laser micro-Raman spectroscopy has been used previously in the art to detect the presence of surface defects in graphite. The first order laser Raman spectrum for a typical natural graphite typically exhibits two absorption bands including a sharp, intense band centered at about 1570-1580 $cm^{-1}$ and a broader, weak band at about 1330 to 1360 $cm^{-1}$. These bands correspond to the well-known "G" and "D" bands, respectively, and have been attributed to graphitic sp2 bonding in the graphene planes. The "D" band is believed to be associated with structural disorder at the surface the particle and typically is absent for single crystal graphite. Specifically, the "D" band has been attributed to a vibrational mode originating from a distortion of the hexagonal lattice near the edges of crystallites. See, for example, M. Nakamizo, H. Honda, M. Inagaki, Carbon, 16(4), 281(1978). The ratio of the normalized intensity or alternatively, the integrated area under the peak, of the "D" band to that of the "G" band can be correlated to the relative number of defects in the graphite crystal lattice. See, for example, J.-N. Rouzard and A. Oberlin, Carbon, 27, 517(1989). A typical value for defect ratio of a pristine synthetic graphite is about 0.05. The presence of even a rudimentary "D" band in the Raman spectrum indicates the presence of surface defects. For example, mechanical milling of a commercial graphite pow-der to reduce average particle size can increase the defect ratio as surface defects are created.

According to some embodiments, the conformably coating step may be carried out by chemical vapor deposition or plasma enhanced chemical vapor deposition.

In another aspect, the present disclosure relates to a cathode to be inserted into a non-aqueous rechargeable metal-air battery.

Therefore, according to embodiments of the present disclosure, a cathode to be inserted into a non-aqueous rechargeable metal-air battery is provided. The cathode includes a pre-conditioned 3D nanomesh structure made of nanowires made of electronic conductive metal material, the pre-conditioned 3D nanomesh structure being free of cathode active material.

According to some embodiments, the nanowires may be hollow.

When hollow, nanowires are sometimes referred to as nanotubes.

According to some embodiments, the cathode may include a plurality of pre-conditioned 3D nanomesh structures disposed in series.

The cathode may be made of a plurality of pre-conditioned 3D nanomesh structures.

According to some embodiments, the cathode may also include at least a gas diffusion layer disposed between two adjacent pre-conditioned 3D nanomesh structures.

The cathode may include, between two adjacent pre-conditioned 3D nanomesh structures, a gas diffusion layer. The gas diffusion layer may not be present between each pair of adjacent pre-conditioned 3D nanomesh structures. Gas diffusion layer are typically light, thin and porous and mechanically stable layer made of carbon paper or carbon cloth used in Fuel cell. Their role is to distribute the gas ($O_2$ in the present disclosure) in an "homogeneous" way from the large pores to the smaller pores within the fuel cell. Tortuosity and permeability of gas diffusion layer is important. In embodiments of the present disclosure, the gas diffusion layer may be hydrophobic since the metal-air battery uses a non-aqueous electrolyte.

According to some embodiments, the nanowires may have a diameter smaller than or equal to 500 nm and an aspect ratio greater than or equal to 20.

According to some embodiments, the spacing between the longitudinal axis of two neighboring nanowires may be greater than or equal to 20 nm, in embodiments, greater than or equal to 50 nm and smaller than or equal to 600 nm, in embodiments, smaller than or equal to 250 nm or may be equal to 80 nm, the spacing being larger than the diameter of the nanowires.

According to some embodiments, the pre-conditioned 3D nanomesh structure may have a thickness greater than or equal to 1 μm, in embodiments, greater than or equal to 3 μm, in embodiments, greater than or equal to 10 μm and smaller than or equal to 500 μm, in embodiments, smaller than or equal to 300 μm, in embodiments, smaller than or equal to 100 μm.

It is understood that the above-values are given for a single 3D nanomesh structure. In case of a multi 3D nanomesh structure value of the thickness of the 3D nanomesh structure may be between N times of single 3D nanomesh structure between 1 μm and 100 μm, 2<N being calculated depending on the application required. For example, it might be expected that it will be more efficient to use 5×100 μm 3D nanomesh structure than one single 3D nanomesh structure of 500 μm.

According to some embodiments, the pre-conditioned 3D nanomesh structure may have a volumetric surface area greater than or equal to 20 $m^2/cm^3$, in embodiments, greater than or equal to 30 $m^2/cm^3$, in embodiments, greater than or equal to 40 $m^2/cm^3$, in embodiments, greater than or equal to 50 $m^2/cm^3$ and a porosity greater than or equal to 50 vol % and smaller than or equal to 90 vol %.

According to some embodiments, the electronic conductive metal material may be nickel, cobalt, gold, palladium, platinum, copper, titanium or aluminium or a mixture thereof.

In another aspect, the present disclosure relates to a non-aqueous rechargeable metal-air battery.

Therefore, according to embodiments of the present disclosure, a non-aqueous rechargeable metal-air battery is provided. The non-aqueous rechargeable metal-air battery includes a cathode as previously defined.

According to some embodiments, the non-aqueous rechargeable metal-air battery may include a non-aqueous electrolyte, wherein the non-aqueous electrolyte may be free of carbonate group.

A carbonate group is a $CO_3^{2-}$ group.

According to some embodiments, the metal-air battery may be a lithium-air battery.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the disclosure and together with the description, serve to explain the principles thereof.

FIGS. 7A and 7B are graphs representing the current density as a function of voltage for Comparative Example 1.

FIGS. 9A and 9B are graphs representing the current density as a function of voltage for Example 1.

FIG. 14 is a graph representing voltage as a function of the areal capacity for Comparative Example 1, Example 2 and Example 4.

FIG. 15 is a graph representing the areal capacity during charging and discharging

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
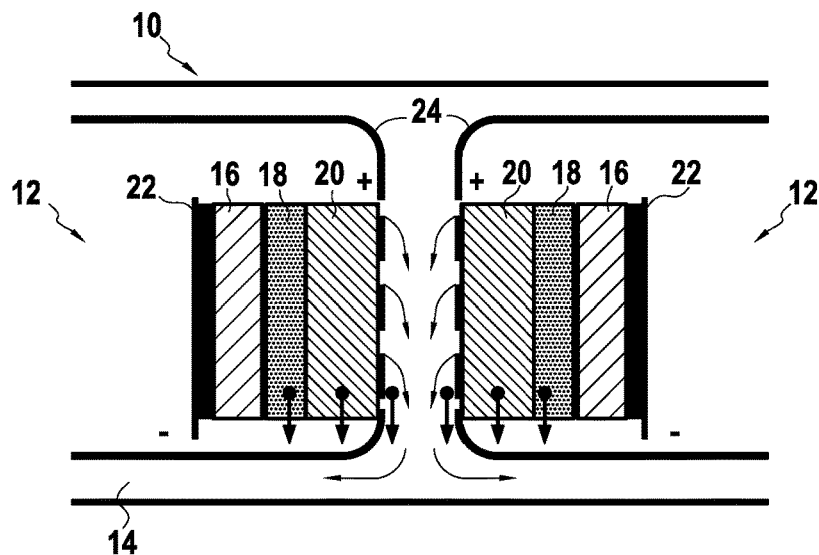
FIG. 1 is a general schematic diagram of a metal-air battery.
Figure 2:
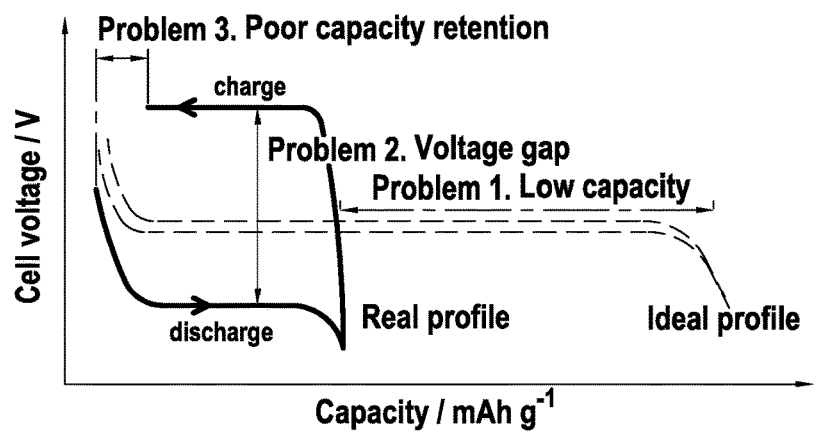
FIGS. 2 and 3 are schematic representations of problems to be addressed in metal-air batteries.
Figure 3:
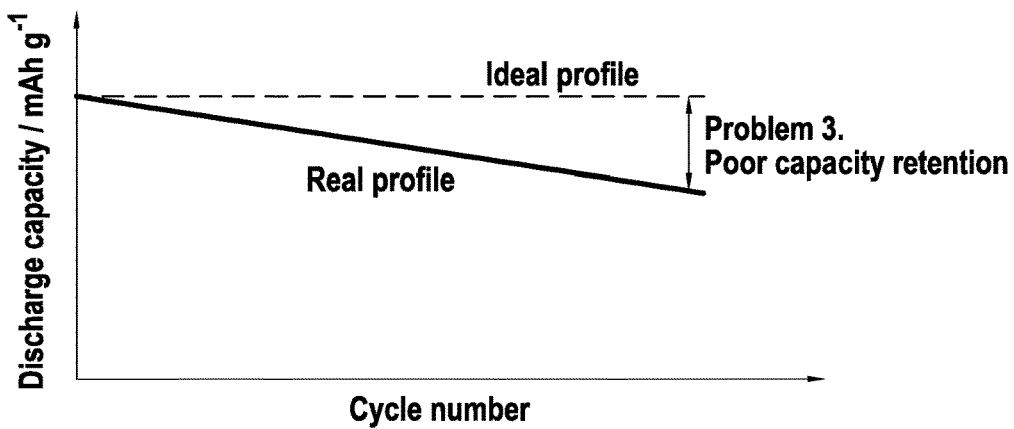

FIG. 1 shows a representation of general schematic diagram of a metal-air battery 10. The metal-air battery 10 is a non-aqueous rechargeable metal-air battery 10. As shown at FIG. 1, the metal-air battery 10 comprises two cells 12 sharing a same gas compartment 14. Alternatively, each cell 12 may have its own gas compartment 14 or the gas compartment 14 may be common to more than two cells.

Each cell 12 comprises a metal anode 16, a non-aqueous electrolyte 18 (and/or separator), and an air cathode 20. The non-aqueous electrolyte 18 is placed between the anode 16 and the cathode 20. The anode 16 and the cathode 20 comprise respectively an anode current collector 22 and a cathode current collector 24. The anode current collector 22 and the cathode current collector 24 are connected to an electrical circuit.

Figure 4:
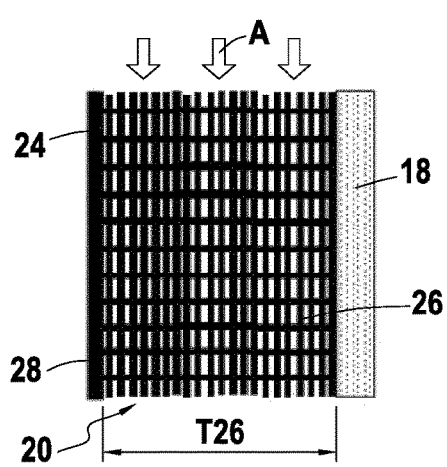
FIG. 4 shows an exemplary cathode and electrolyte/separator according to embodiments of the present disclosure.

According to some embodiments, as shown at FIG. 4, the cathode 20 comprises a pre-conditioned 3D nanomesh structure 26 made of nanowires made of electronic conductive metal material. The pre-conditioned 3D nanomesh structure 26 is sandwiched between the separator impregnated with the non-aqueous electrolyte 18 and the cathode current collector 24, which is a metallic plate 28 on which the pre-conditioned 3D nanomesh structure 26 has been grown. In embodiments, the metallic plate 28 and the pre-conditioned 3D nanomesh structure 26 are made of the same material.

In the embodiment of FIG. 4, the cathode 20 comprises a single pre-conditioned 3D nanomesh structure 26.

Electronic conductive metal material may be nickel, gold, palladium, platinum, copper, titanium or aluminium or a mixture thereof.

The anode 16 comprises at least an anode active material (which may also be referred to as "negative electrode active material" hereinafter). As the anode active material, general anode active materials for metal-air batteries such as lithium-air batteries may be used and the anode active material is not particularly limited. In general, the anode active material is able to store/release a metal ion ($Li^+$, $Na^+$, $K^+$ ...), $Li^+$ ions being present in Li-air batteries, $Na^+$ ions in Na-air batteries etc. Specific anode active materials are, for example, metals such as Li, Na, Mg, K, Al, Ca, Zn, Fe, Sn, Si, alloys, oxides and nitrides of the metals, and carbonaceous materials.

Specific anode active materials for rechargeable lithium-air batteries are, for example, a lithium metal, lithium protected anodes, lithium alloys such as a lithium-aluminum alloy, a lithium-tin alloy, a lithium-lead alloy and a lithium-silicon alloy, metal oxides such as a tin oxide, a silicon oxide, a lithium-titanium oxide, a niobium oxide and a tungsten oxide, metal sulfides such as a tin sulfide and titanium sulfide, metal nitrides such as a lithium-cobalt nitride, a lithium-iron nitride and a lithium manganese nitride, and carbonaceous materials such as graphite. In embodiments, lithium metal is the anode active material.

By "lithium-protected anode", reference is made here for example (but is not limited to) a "Lithium Protected Electrode" (LPE) as described by Visco et al. (Polyplus). Usually the Li is covered by a solid electrolyte (for example LISICON with formulae $LiM_2(PO_4)_3$). Between the LiSiCON and the Li metal, there is usually an interlayer (for example consisting of $Cu_3N/Li_3N$). In LPE systems, Li metal can be attached directly to one side of LiSiCON material, or alternatively a small amount of solvent containing a Li salt electrolyte may be added between the LiSiCON material and the Li metal to ensure Li ionic conductivity. Such materials have been described in, for example, U.S. Pat. Nos. 7,282,295, 7,491,458. LiSiCON materials have also been described in Nature Materials, 10, 682-686 (2011).

When a metal, alloy or the like in the form of foil or metal is used as the anode active material, it can be used as the anode itself. The anode is required to contain at least an anode active material; however, as needed, it can contain a binder for fixing the anode active material. The type and usage of the binder are the same as those of the air cathode described hereinafter, so that they will not be described here.

In general, an anode current collector 22 is connected to the anode 16, which collects current from the anode 16. The material for the anode current collector 22 and the shape of the same are not particularly limited. Examples of the material for the anode current collector include stainless steel, copper, nickel, carbon and the like. Examples of the form of the anode current collector include a foil form, a plate form and a mesh (grid) form.

In the metal-air, e.g. lithium-air, battery of the present disclosure, the cathode 20 uses oxygen as a cathode active material. Oxygen serving as the cathode active material may be contained in air or oxygen gas.

Non-aqueous solvents used in a metal-air, e.g., lithium-air battery of the present disclosure may be freely chosen among aprotic organic solvents known for use in metal-air batteries such as lithium-air batteries. Examples of such aprotic organic solvents include cyclic esters, cyclic ethers, and chain ethers. Examples of cyclic ethers include tetrahydrofuran (THF) and 2-methyltetrahydrofuran. Examples of chain ethers include dimethoxyethane (DME) and ethylene glycol dimethyl ether, diethylene glycol dimethyl ether (DEGDME), tetraethylene glycol dimethyl ether (TEGDME). These may be used separately or in combination as a mixture. Solvents from the sulfoxide family (R—SO—R'), for example dimethyl sulfoxide (DMSO), can be used as well. Nitrile solvents can also be used, such as acetonitrile, propionitrile, and 3-methoxypropionitrile. Linear amides, lactams, or ureas also constitute possible non-aqueous solvents used in a lithium-air battery of the present disclosure. Such linear amides, lactams, or ureas may include N,N-dimethylformamide; dimethylacetamide; N-methylpyrrolidone; tetra methyl urea; tetraethylurea.

An ionic liquid may be used in the electrolyte, in embodiments, a room temperature ionic liquid. Example of such ionic liquids are N-methyl-N-propyl piperidinium bis (trifluoromethane sulfonyl) imide (PP13TFSI), Ethyl Methyl Imidazolium (Trifluoromethane sulfonyl) imide (EMI)TFSI, DiEthylmethyl(2-MethoxyEthyl)ammonium bis(TriFluoromethylSulfonyl)Imide (DEME-TFSI) and mixtures thereof.

It may further be contemplated in the framework of the present application to add an oxygen dissolution enhancer to the electrolyte medium. This oxygen dissolution enhancer may be a fluorinated polymer, a fluorinated ether, a fluorinated ester, a fluorinated carbonate, a fluorinated carbon material, a fluorinated blood substitute, or indeed a metalloprotein. Such oxygen dissolution enhancers are described in US2010266907.

It may be beneficial to add to a Li-air battery solvent in the present application a boron ester of general formula Y—C$((CH_2O)Z^1O)(Z^2O))B$, having some Lewis acidity properties which may help to dissolve partially or fully compounds like $Li_2O_2$ or $Li_2O$ [cf. Shanmukaraj et al., JACS, 2010, 132, 3055-3062].

Examples of non-aqueous electrolytes for non-aqueous rechargeable metal-air battery are given in WO2013053378.

In embodiments, the non-aqueous electrolytes are electrolytes free of carbonate group.

Figure 5:
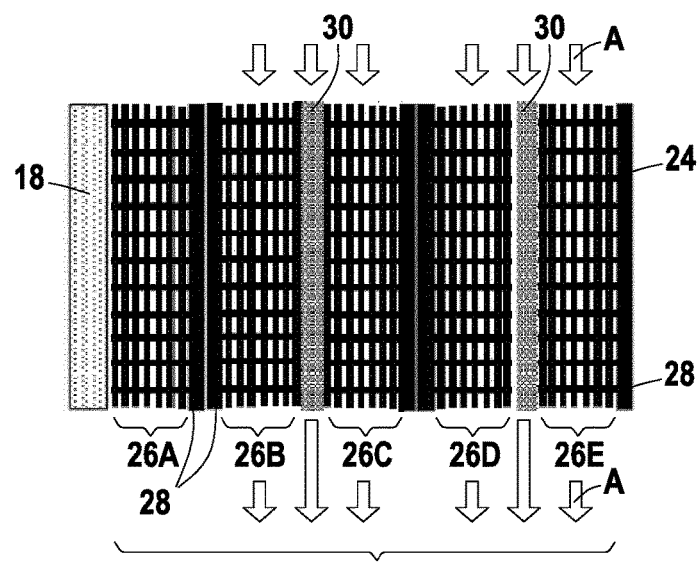
FIG. 5 shows another exemplary cathode and electrolyte/separator according to embodiments of the present disclosure.
Figure 6:
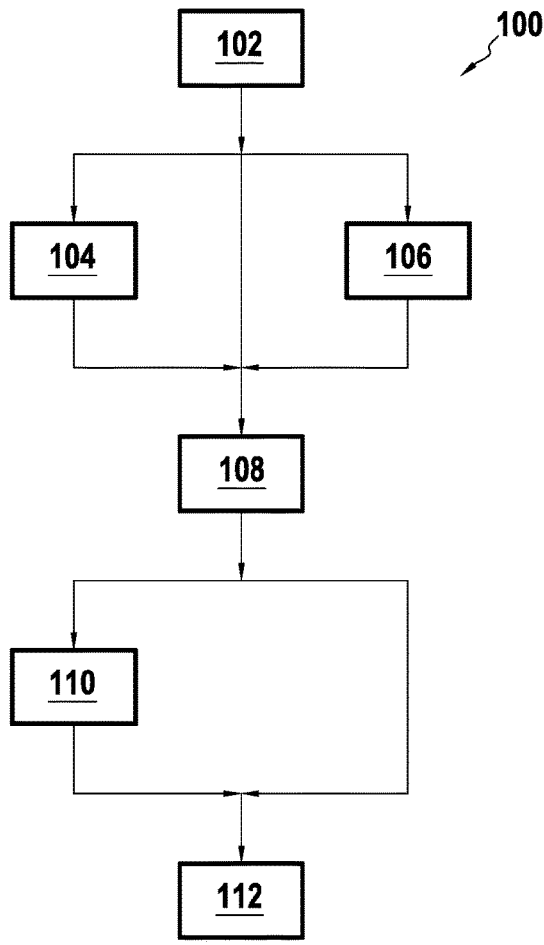
FIG. 6 is a flow chart of the method according to embodiments of the present disclosure.

According to some embodiments, as shown at FIG. 5, the cathode 20 comprises a plurality of pre-conditioned 3D nanomesh structure 26 disposed in series. In the embodiment of FIG. 6, as a non-limiting example, the cathode 20 may comprise five pre-conditioned 3D nanomesh structure 26A-26E, the pre-conditioned 3D nanomesh structure 26A is in contact with the non-aqueous electrolyte 18 and the metallic plate 28 of the pre-conditioned 3D nanomesh structure 26E is the cathode current collector 24. It is understood the cathode 20 may comprise a different number of pre-conditioned 3D nanomesh structure 26.

As shown at FIG. 6, the pre-conditioned 3D nanomesh structure 26 are disposed so that the metallic plate 28 of two adjacent pre-conditioned 3D nanomesh structure 26A, 26B are in contact with each other. The same applies to adjacent pre-conditioned 3D nanomesh structure 26C, 26D. Between two adjacent pre-conditioned 3D nanomesh structure 26B, 26C not being in contact with each other through the metallic plate 28, a gas diffusion layer 30 is sandwiched. The same applies to adjacent pre-conditioned 3D nanomesh structure 26D, 26E.

In an exemplary, but not limiting, embodiment of the present disclosure, as shown at FIG. 4, the cathode 20 comprises a single pre-conditioned 3D nanomesh structure 26 made of nickel and having a thickness T26 greater than or equal to 1 μm or 3 μm or 10 μm.

In an exemplary, but not limiting, embodiment of the present disclosure, as shown at FIG. 5, the cathode 20 comprises five pre-conditioned 3D nanomesh structure 26A-26E made of nickel and each having a thickness T26 greater than or equal to 1 μm or 3 μm or 10 μm, the total thickness of the pre-conditioned 3D nanomesh structure 26a-26E being respectively, 5 μm, 15 μm or 50 μm.

It may be understood that the five pre-conditioned 3D nanomesh structure 26A-26E are shown at FIG. 5 as having the same thickness T26. It is also possible that each pre-conditioned 3D nanomesh structure 26A-26E has a thickness T26 different from the thickness of the other pre-conditioned 3D nanomesh structure or that some pre-conditioned 3D nanomesh structures have the same thickness, while other pre-conditioned 3D nanomesh structures forming the cathode 20 have different thickness.

FIG. 6 shows a flow chart of the method 100 for making a non-aqueous rechargeable metal-air battery 10 according to embodiments of the present disclosure.

The method 100 comprises a step of making 102 a cathode 20 comprising a 3D nanomesh structure made of electronic conductive metal material, inserting 108 the cathode 20 in the battery 10 and charging/discharging 112 the battery 10 so as to form the cathode active material on a pre-conditioned 3D nanomesh structure 26.

The method 100 also comprises, before and/or after inserting 108 the cathode 20 in the battery 10, a pre-conditioning step 104, 106, 110 of the 3D nanomesh structure is carried out, so as to obtain the pre-conditioned 3D nanomesh structure 26, the pre-conditioned 3D nanomesh structure 26 being free of cathode active material.

As shown at FIG. 6, the pre-conditioning steps may be carried out before inserting 108 the cathode 20 in the battery 10.

Before inserting the cathode 20 in the battery 10, the pre-conditioning step may comprise a drying step 104 of the 3D nanomesh structure so as to obtain a pre-conditioned 3D nanomesh structure 26.

Before inserting the cathode 20 in the battery 10, the pre-conditioning step may alternatively comprise a step of conformably coating 106 the 3D nanomesh structure with amorphous carbon, the amorphous carbon coating having a thickness smaller than or equal to 2 nm.

It is understood from the flow chart shown at FIG. 6 that, as an alternative to the drying step 104 or the coating step 106, there may be no pre-conditioning step before inserting the cathode 20 in the battery 10.

As shown at FIG. 6, the pre-conditioning steps may be carried out after inserting 108 the cathode 20 in the battery 10.

After inserting the cathode 20 in the battery 10, the pre-conditioning step may comprise a formation step 110 to the 3D nanomesh structure in the non-aqueous electrolyte 18 to be used in the metal-air battery 10 under an inert atmosphere.

The formation step 110 may be carried out alone or after the drying step 104 or after the coating step 106.

The drying step 104 or the coating step 106 may be carried out alone or before the formation step 110.

It is understood that at least one of the drying step 104, coating step 106 or the formation step 110 is carried out so as to obtain the pre-conditioned 3D nanomesh structure 26.

The 3D nanomesh structure made of electronic conductive metal may be made using the method disclosed in WO2019016036, in particular method 100 and 200 for AAO fabrication and deposition steps 101-105 or 201-203.

EXAMPLES

The following experimental examples are illustrative and enable the functioning of the disclosure to be understood. The scope of protection is not limited to the specific embodiments described hereinafter.

1—Preparation of Non-Aqueous Electrolyte 1.1—0.5 M LiTFSI in DME

To prepare 0.5 M LiTFSI/DME electrolyte (DME), 100 mL of 1,2-Dimethoxyethane (99.5%, Sigma-Aldrich) is mixed and stirred with 14.4 g of Bis(trifluoromethylsulfonyl)amine lithium salt (99%, ABCR) under Ar atmosphere at a rotation speed of 600 rpm for 1 h. This non-aqueous electrolyte is an example of non-aqueous electrolyte free of carbonate group.

1.2—0.32 mol/kg LiTFSI in DEME-TFSI

To prepare 0.32 mol/kg LiTFSI/DEME-TFSI electrolyte (IL), 50 g of N,N-Diethyl-N-methyl-N-(2-methoxyethyl)ammonium bis(trifluoromethanesulufonyl)imide (99.9%, KANTO CHEMICAL. CO. INC.) is mixed and stirred with 4.6 g of Bis(trifluoromethylsulfonyl)amine lithium salt (99%, ABCR) under Ar atmosphere at a rotation speed of 600 rpm for 1 h. This non-aqueous electrolyte is an example of ionic liquid electrolyte free of carbonate group.

2—Preparation of $TiO_2$ Wire Reference Electrode for Cell Test

To investigate electrochemical activities of one system in $N_2$ atmosphere, we introduce a Ti wire (Sigma-Aldrich) as a reference electrode (RE) for our system instead of Li metal. To minimize ohmic drop and avoid short circuit, the reference electrode is placed in a plastic pipet and placed close to the cell bottleneck. Here, the direct distance between reference electrode (RE) and working electrode (WE) is 1 cm. To estimate Open Circuit Voltage (OCV) of Ti wire reference electrode vs. Li metal, the OCV of Ti wire is measured versus standard $Ag/AgNO_3$ reference electrode (BASi) in $N_2$ atmosphere, which is itself measured against Li metal (3.3 V vs. $Li^+$/Li) in Ar atmosphere. Therefore, the OCV of working electrodes versus Ti wire reference electrode is corrected by adding +3.3 V to estimate equivalent OCV versus Li metal in this report. The OCV difference of Ti wire vs. $Ag/AgNO_3$ standard reference electrode is calculated to be 50 mV for 15 cycles, which indicates less than 4 mV is shifted per each cycle. Therefore, we assume that there is no more than 100 mV deviation in this study during the electrochemical tests.

3—Preparation of the Cell for Test in 0.5 M LiTFSI in DME (Before Testing)

A commercial titration vessel (Metrohm) has been modified to clamp the working electrode (WE) wafer with a specific reaction area of 0.385 $cm^2$ in the bottom of the glass cell. The internal volume of this modified glass cell is 50 mL. The glass cell is then filled with the 30 mL of prepared electrolyte after working electrode is clamped in $N_2$-filled acryl glovebox (815-PGB, Plas-Labs, Inc.). The commercial titration vessel lid (Metrohm) is put on the top of the modified vessel to allow the insertion of a Ti wire (Sigma-Aldrich) reference electrode (RE), a Pt rod (Metrohm) counter electrode (CE), and a gas inlet and overflow tube with valve (Metrohm). Here, the actual contact area of counter electrode is 1.9 $cm^2$. For electrochemical measurement, the edge of working electrode is bound to conductive copper tape, which is directly connected to the electrode wire of Autolab potentiostat (PGSTAT100, Metrohm).

4—Preparation of the Cell for Test in 0.32 Mol/Kg LiTFSi in DEME-TFSI (Before Testing)

Each working electrode sample with a selected contact area of 0.95 $cm^2$ is placed in a commercial bottom magnetic mount electrochemical cell (RedoxMe) with inner volume of 15 mL. The cell is then filled with the prepared electrolyte before it is sealed by a top casting, which allows the insertion of a Pt wire (RedoxMe), a Ti wire (Sigma-Aldrich), and gas inlet/outlet tubing. To minimize the ohmic drop, a Ti wire (RE) is put into the non-aqueous reference electrode luggin capillary (BASi) without a frit part before it is plugged into the top casting of the cell body. Here, the actual contact area of Pt wire is 1.3 $cm^2$, while the direct distance between Ti wire and working electrode sample is 0.5 cm. The gas inlet and outlet tubings are connected to stainless steel quarter-turn instrument plug valve (Swagelok) to directly supply oxygen into the electrolyte during the electrochemical measurement.

The magnetic mount cell allows the direct contact between working electrode wafer (1.5×1.5 $cm^2$) and potentiostat wire via conductive copper tape. Cyclic voltammetry (CV) has been measured using Autolab potentiostat (PGSTAT100, Metrohm).

5—Cyclic Voltammetry (CV) Measurement in 0.5 M LiTFSI in DME Testing Cell

Each working electrode sample is clamped in the bottom of glass cell, which is filled with 30 mL of 0.5 M LiTFSI/DME electrolyte.

Cyclic voltammetry (CV) measurement has been carried out for the loaded working electrode at a scan rate of 25 mV/s and initial step potential of −0.002 V in the voltage range between −1.5 and 1.5 V vs. Ti (1.8-4.8 V vs. $Li^+$/Li) under $N_2$ atmosphere.

Note that measurement under inert atmosphere (here $N_2$) are done to obtain a baseline/background of the electrochemical activity of the sample in an inert gas (and ultimately to compare under $O_2$-containing gas, $O_2$ being the reactant or active material in the battery).

After the measurement under $N_2$, $O_2$ is directly purged into each electrolyte at a flow rate of 50 mL/min for 30 min to ensure that $O_2$ is saturated in the electrolyte. $O_2$ is then purged onto the electrolyte surface for glass cell to avoid violent agitation of reference and counter electrodes due to the $O_2$ bubbles, while direct $O_2$ purging is maintained for magnetic mount cell during the measurements.

The obtained cyclic voltammogram of each sample under $N_2$ atmosphere is then plotted (fifteenth cycle for $N_2$) together with third cycle under $O_2$ to investigate the effects of $O_2$.

6—Cyclic Voltammetry (CV) Measurement in 0.32 Mol/Kg LiTFSi in DEME-TFSI Testing Cell Each working electrode sample is clamped in the bottom of commercial bottom magnetic mount electrochemical cell (RedoxMe), which is filled with 15 mL of 0.32 mol/kg LiTFSI/DEME-TFSI electrolyte.

Cyclic voltammetry (CV) measurement has been carried out for the loaded working electrode at a scan rate of 25 mV/s and initial step potential of −0.002 V in the voltage range between −1.5 and 1.5 V vs. Ti (1.8-4.8 V vs. Li+/Li) under $N_2$ atmosphere.

Note that measurement under inert atmosphere (here $N_2$) are done to obtain a baseline/background of the electrochemical activity of the sample in an inert gas (and ultimately to compare under $O_2$-containing gas, $O_2$ being the reactant or active material in the battery).

After the measurement under $N_2$, $O_2$ is directly purged into the electrolyte at a flow rate of 50 mL/min for 30 min to ensure that $O_2$ is saturated in each electrolyte. $O_2$ is then purged onto the electrolyte surface for glass cell to avoid violent agitation of reference and counter electrodes due to the $O_2$ bubbles, while direct $O_2$ purging is maintained for magnetic mount cell during the measurements.

The obtained cyclic voltammogram of each sample under $N_2$ atmosphere is then plotted together with third cycle under $O_2$ to investigate the effects of $O_2$.

Comparative Example 1—Glassy Carbon

A commercial glassy carbon (GC) (25×25×0.3 mm, HTW) is used as the cathode.

Cyclic voltammograms for 0.5 M LiTFSI in DME testing cell and 0.32 mol/kg LiTFSi in DEME-TFSI testing cell are shown respectively at FIGS. 7A and 7B. In FIGS. 7A and 7B the y-axis represents the current density expressed in mA $cm^{-2}$ and the x-axis represents the voltage vs. Li+/Li expressed in V.

For the glassy carbon, the formation step 110 comprises three cycles under $N_2$ before the measurement under $O_2$ is carried out. Under $N_2$, only the measurement made during the last cycle is plotted.

In 0.5 M LiTFSI/DME

The cyclic voltammogram of glass carbon with 0.5 M LiTFSI/DME electrolyte shows distinctive reduction peaks at 2.3 V and 2.1 V vs. Li+/Li.

On the other hand, a number of oxidation peaks at 3.6 V, 4.1 V, and 4.4 V vs. Li are found during charging process.

The calculated charge density of glassy carbon under $N_2$ is −0.105 mC/cm² for negative area and 0.167 mC/cm² for positive area, respectively.

The charge density under $O_2$ is then subtracted form values under $N_2$. On the other hand, the charge density due to the presence of $O_2$ ($C_{O2}$-$C_{N2}$) is −6.04 mC/cm² for reduction reaction and 1.56 mC/cm² for oxidation reaction, respectively. This result shows a typical irreversible reaction between $Li_2O_2$ and Li/$O_2$.

In 0.32 mol/kg LiTFSi in DEME-TFSI

To further investigate the feasibility of ionic liquid for Li—$O_2$ battery, the magnetic mount cell is filled with 15 mL of 0.32 mol/kg LiTFSI/DEME-TFSI and the cell is cycled under $N_2$, followed by CV cycling under $O_2$ purging at a flow rate of 50 mL/min. The voltage range is set to be 1.8-4.8 V vs. Li+/Li (−1.5-1.5 V vs. Ti) and the scan rate is set to be 25 mV/s. The obtained charge density of glassy carbon from its final cycle (15th) in $N_2$ atmosphere in 0.32 mol/kg LiTFSI/DEME-TFSI is −0.424 mC/cm² for negative area and 0.516 mC/cm² for positive area. The charge density under $O_2$ is then subtracted from values under $N_2$. The calculated charge density ($C_{O2}$-$C_{N2}$) is −0.206 mC/cm² for reduction reaction and 0.166 mC/cm² for oxidation reaction, respectively.

Although the calculated charge density of sample using 0.32 mol/kg LiTFSI/DEME-TFSI (IL-GC) is largely decreased compared to the sample using 0.5 M LiTFSI/DME (DME-GC), the cyclic reversibility ($C_{oxy}/C_{red}$) of IL-GC is considerably increased to 81% from 26% (DME-GC).

Comparative Example 2—Ni Planar

A Ni planar working electrode wafer (Ni) (2×2 cm²) is obtained by cleaving 200 mm Ni/TiN/Si wafer (imec) prepared via sputter deposition method.

Figure 8A:
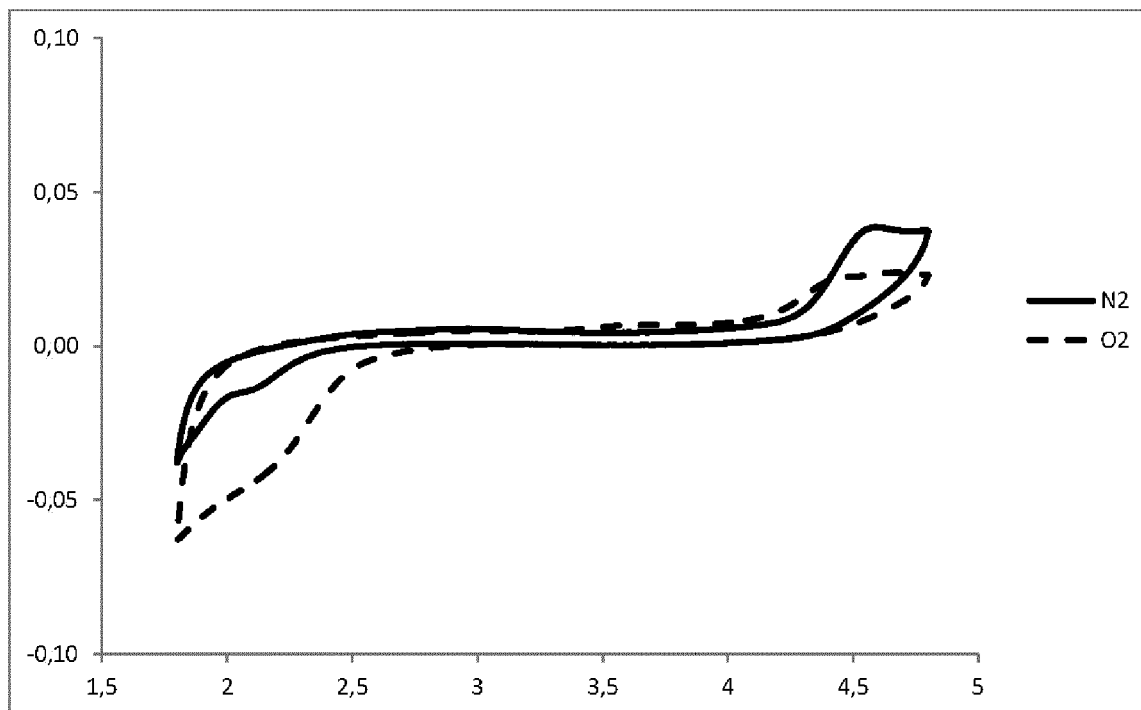
FIGS. 8A and 8B are graphs representing the current density as a function of voltage for Comparative Example 2.
Figure 8B:
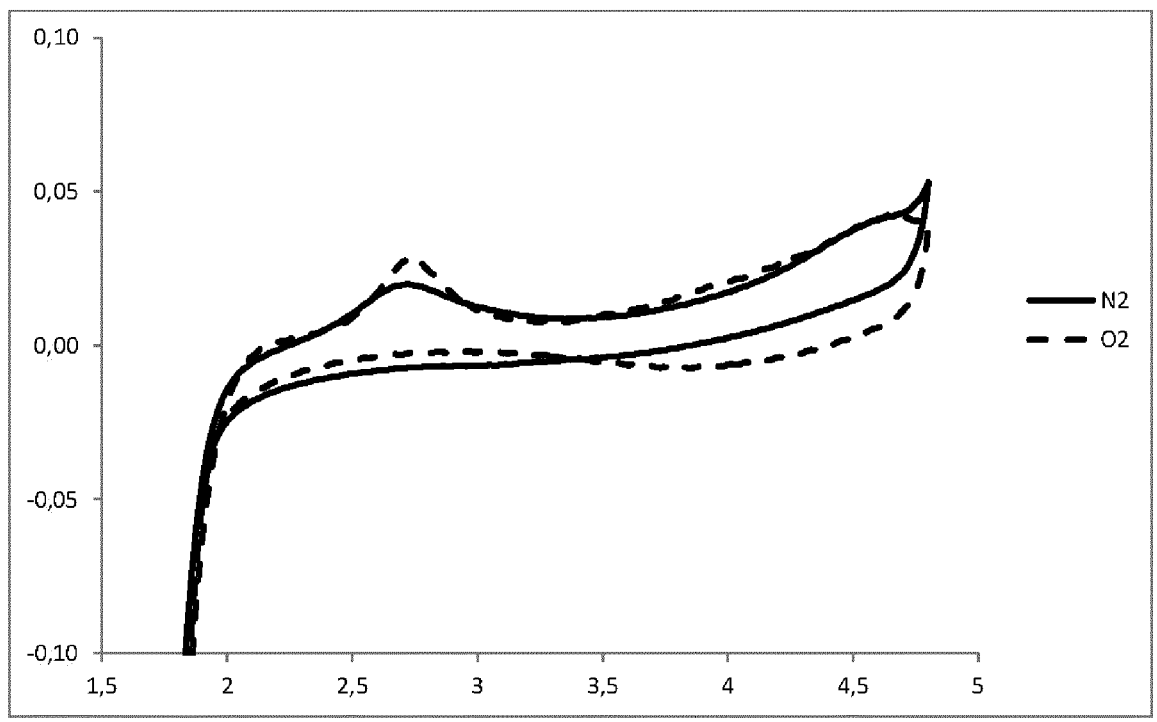

Cyclic voltammograms for 0.5 M LiTFSI in DME testing cell and 0.32 mol/kg LiTFSi in DEME-TFSI testing cell are shown respectively at FIGS. 8A and 8B. In FIGS. 8A and 8B the y-axis represents the current density expressed in mA $cm^{-2}$ and the x-axis represents the voltage vs. Li+/Li expressed in V.

For the Ni planar, the formation step 110 comprises fifteen cycles under $N_2$ before the measurement under $O_2$ is carried out. Under $N_2$, only the measurement made during the last cycle is plotted. It is understood that the number of cycles may be reduced depending upon the experiment. However, for comparison, the number of cycles under $N_2$ has been kept to fifteen.

For simplification, the Ni planar sample that is studied in 0.5 M LiTFSI/DME electrolyte and in 0.32 mol $kg^{-1}$ LiTFSI/DEME-TFSI electrolyte is abbreviated as DME-Ni and IL-Ni, respectively.

From both samples, a rapid increase in negative current is observed near the end of discharge (1.9±0.1 V vs. $Li^+$/Li/− 1.4±0.1 V vs. Ti).

The calculated charge density ($C_{O2}$-$C_{N2}$) for DME-Ni is −0.812 mC $cm^{-2}$ for reduction reaction and −0.212 mC $cm^{-2}$ for oxidation reaction. This negative oxidative charge density is due to relatively small current density obtained from an oxidative peak centered at 4.5 V vs. Li+/Li under $O_2$ compared to that from a broad peak starting from 4.3 V vs. Li+/Li under $N_2$. In fact, this observation is not surprising as pure nickel is known to suffer from oxidation into electrical insulator NiO and electrolyte decomposition both at low and high potential area (<2.0 V or >4.2 V vs. Li+/Li). On the other hand, no distinctive difference is found from CV cycles of IL-Ni, which results in a little to no summed charge density ($C_{O2}$-$C_{N2}$).

Example 1—3 D Nickel Nanomesh with Formation Step

Step 102: a 3D nickel nanomesh electrode wafer (2×2 cm²) is obtained by cleaving 23.75 cm² NM/TiN/Si wafer. The electrochemical deposition and etching process for Ni nanomesh is detailed in the previously reported procedure (see WO2019016036) with the same nickel plating current rate of 10 mA/cm². A summary of 3D nickel nanomesh fabrication process is as follows: the anodization of Cu-doped Al substrate is carried out under continuous voltage of 40 V, followed by overanodization for 300-500 s in 0.3 M oxalic acid vs Ti mesh as a counter electrode. The anodized cell is etched with standard cleaning solution (SC-1) for 180-270 seconds and washed five times with deionized water. The nickel plating solution is prepared by dissolving 0.63 mol Nickel sulfamate and 0.63 mol boric acid in 1 L of deionized water under continuous stirring. The solution is poured into the cell and galvanostatic reduction of nickel is carried out vs. nickel foil counter electrode at a current rate of 10 mA $cm^{-2}$ for 250 seconds. The nickel-plated substrate is washed five times and then etched with 0.5 M KOH for 30 min to remove the anodic aluminium oxide (MO), which is then washed and vacuum-dried before the electrochemical measurements. A 3D nickel nanomesh structure is obtained. As this 3D nanomesh structure is freshly made, it is also referred hereunder as pristine 3D nanomesh structure. In Example 1, the 3D nanomesh structure has a thickness T26 equal to 3.3 µm.

The amount of deposited nickel for 3 µm thick 3D nickel nanomesh is equivalent to 0.7 µm thick planar nickel substrate, having the theoretical porosity of 76%. Each nanowire has an average thickness of 40 nm interconnected to other horizontal and vertical nanowires with an average inter spacing of 60 nm, having a surface area to footprint area ratio of 90 $cm^2/1$ $cm^2$ (30 $cm^2$ for 1 µm thick nanomesh).

After step 102, the pristine 3D nickel nanomesh structure is inserted in the battery 10, in this case in the test cell for test in 0.5 M LiTFSI in DME, an extra step of pre-conditioning of the pristine 3D nickel nanomesh structure consisting in pre-cycling or forming (step 110) the pristine 3D nickel nanomesh structure for n cycles at 25 mV $s^{-1}$ in the electrolyte under an inert atmosphere (here $N_2$) until the current intensity stabilizes, i.e., until the difference of current density measured between two cycles is smaller than or equal to 1 µA $cm^{-2}$. Note that this stabilization happens in this particular example after 3 cycles (but for consistency between all experiments we always apply 15 cycles under $N_2$). During the pre-cycling under $N_2$ atmosphere, a rapid increase in negative current at the end of discharge and a broad oxidative peak between −1.8 and 3.8 V are observed in the first cycle, which is faded from second cycle.

After the formation step 110, the pre-conditioned 3D nanomesh structure 26 is obtained, referred to hereafter also as (FNM).

Cyclic voltammograms for 0.5 M LiTFSI in DME testing cell in $N_2$ and $O_2$ are shown respectively at FIGS. 9A and 9B. In FIGS. 9A and 9B the y-axis represents the current density expressed in mA $cm^{-2}$ and the x-axis represents the voltage vs. $Li^+/Li$ expressed in V.

Figure 10A:
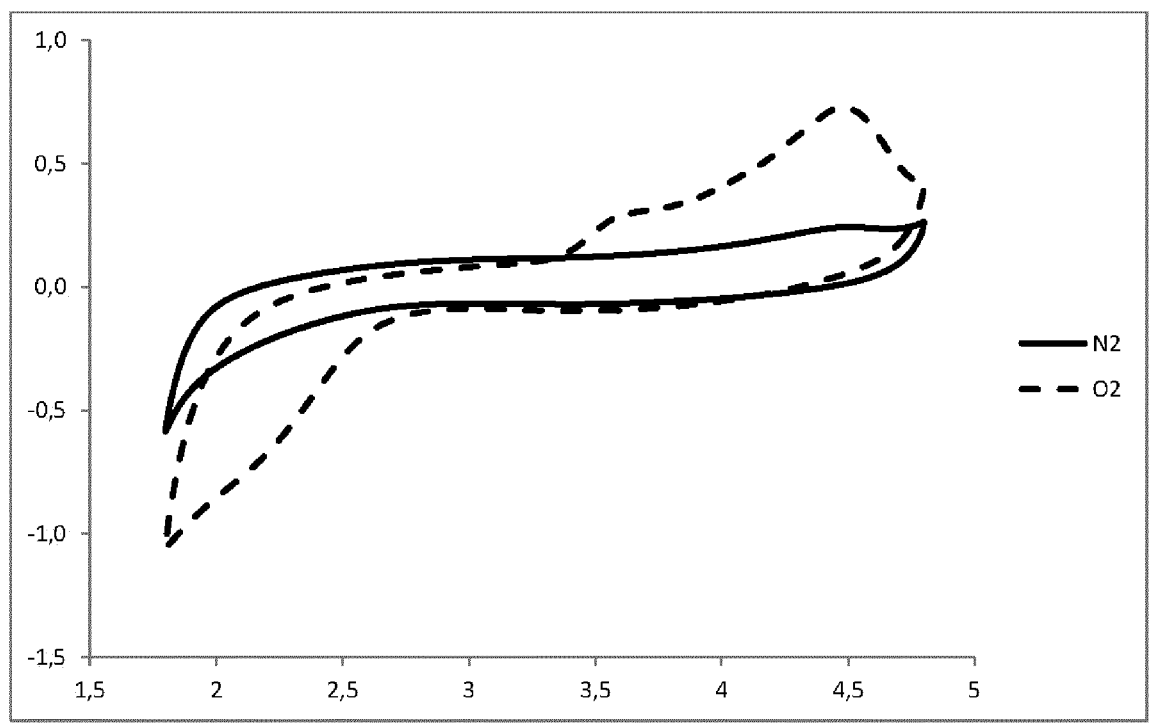
FIGS. 10A and 10B are graphs representing the current density as a function of voltage for Example 2.
Figure 10B:
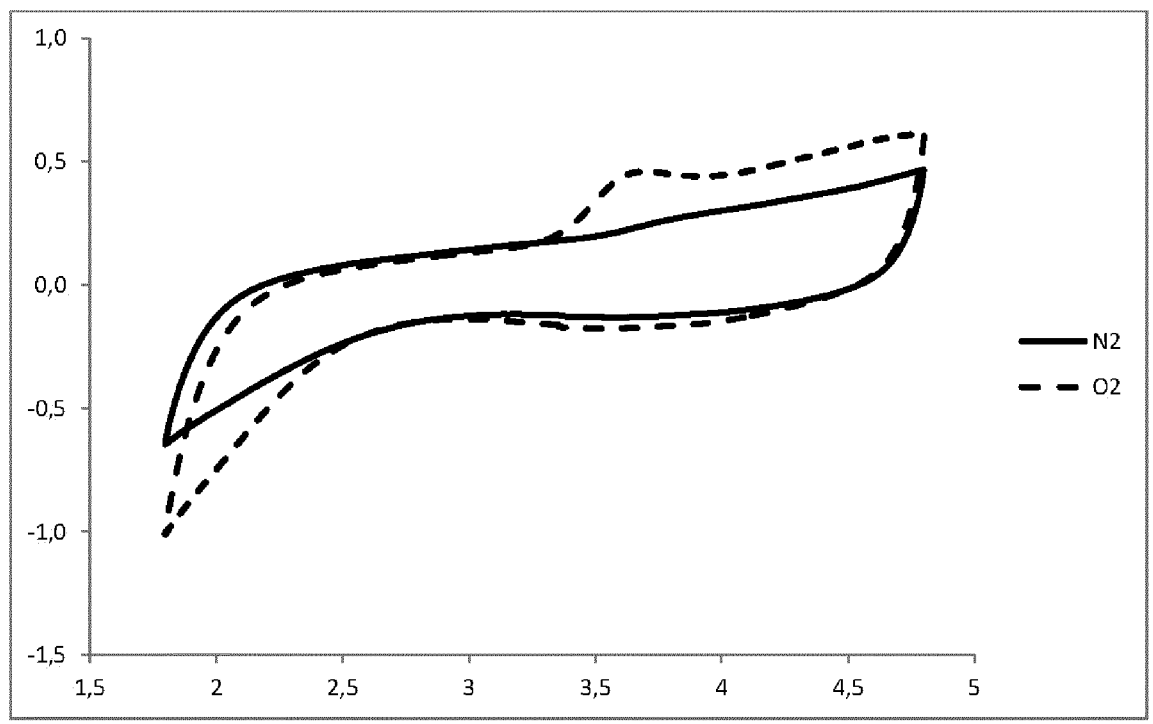

In FIG. 10B, the cycle plotted for $N_2$ is the fifteenth cycle, while the cycle plotted for $O_2$ is the third cycle.

To investigate the effects of $O_2$, the pre-conditioned 3D nanomesh structure 26 is then cycled under $O_2$, which shows a huge increased current density above −2.3 V and two distinctive oxidative peaks centered at 3.4 and 4.1 V, respectively. The calculated charge density ($C_{O2}$-$C_{N2}$) is −11.98 mC $cm^{-2}$ for reduction reaction and 8.51 mC $cm^{-2}$ for oxidation reaction with the efficiency ($C_{oxy}/C_{red}$) of 71%. This result shows that both the reductive and oxidative charge density are 1.98 and 5.45 times higher than those of DME-GC, which should be attributable to the enhanced surface area.

Another notable observation is that the Ni planar shows no charge density and efficiency, while Ni nanomesh shows excellent electrochemical activities.

Example 2—3 D Nickel Nanomesh with Drying and Formation Steps

Example 2 is processed as Example 1. An additional pre-conditioning step is performed, which is a drying step 104 of the 3D nanomesh structure before insertion of the cathode 20 in the battery 10.

The drying step 104 is carried out at 100° C. for 1 h.

During this drying process, we assume the following reaction of the surface layer might occur: α-Ni $(OH)_2.xH_2O \rightarrow \beta\text{-Ni}(OH)_2 + xH_2O\uparrow$ The dried Ni nanomesh (DNM), i.e., the pre-conditioned 3D nanomesh structure 26 is transferred to vacuum chamber and further dried for 1 h before it is stored in a $N_2$-filled glove box for future tests.

Cyclic voltammograms for 0.5 M LiTFSI in DME testing cell and 0.32 mol/kg LiTFSi in DEME-TFSI testing cell are shown respectively at FIGS. 10A and 10B. In FIGS. 10A and 10B the y-axis represents the current density expressed in mA $cm^{-2}$ and the x-axis represents the voltage vs. $Li^+/Li$ expressed in V.

In FIGS. 10A and 10B, the cycle plotted for $N_2$ is the fifteenth cycle, while the cycle plotted for $O_2$ is the third cycle.

During the discharging process under $O_2$, a peak shoulder is observed at 2.3 V, which is partially influenced by the stiff current density increase probably due to the initiation of second peak.

Likewise, two oxidative peaks are found at 3.6 V and 4.5 V vs. $Li^+/Li$ with a trace of broadened peak around 4.1 V vs. $Li^+/Li$, which match well with those of DME-GC for (de) plating of $Li_2O_2$. Interestingly, the current peak of oxidation centered at 4.5 V vs. $Li^+/Li$ is largely increased, which is significantly low both in DME-GC and DME-NM.

The calculated charge density ($C_{O2}$-$C_{N2}$) is −18.19 mC $cm^{-2}$ for reduction reaction and 14.71 mC $cm^{-2}$ for oxidation reaction with the efficiency ($C_{oxy}/C_{red}$) of 81%. This result shows that the charge density of dried Ni nanomesh is 3.01 and 9.43 times higher than those of DME-GC. In addition, the efficiency ($C_{oxy}/C_{red}$) of Ni nanomesh is 10% increased by introducing drying process. Meanwhile, the calculated charge density ($C_{O2}$-$C_{N2}$) for IL-DNM is −3.66 mC $cm^{-2}$ for reduction reaction and 3.66 mC $cm^{-2}$ for oxidation reaction with the efficiency of 100%. Although the sample using 0.32 mol $kg^{-1}$ LiTFSI/DEME-TFSI electrolyte shows a poor electrochemical performance compared to that using 0.5 M LiTFSI/DME, IL provides an excellent efficiency for dried Ni nanomesh.

Example 3—3 D Nickel Nanomesh with Drying Step

Example 3 is processed as Example 2 but without the formation step after insertion of the cathode 20 in the battery 10.

Figure 11A:
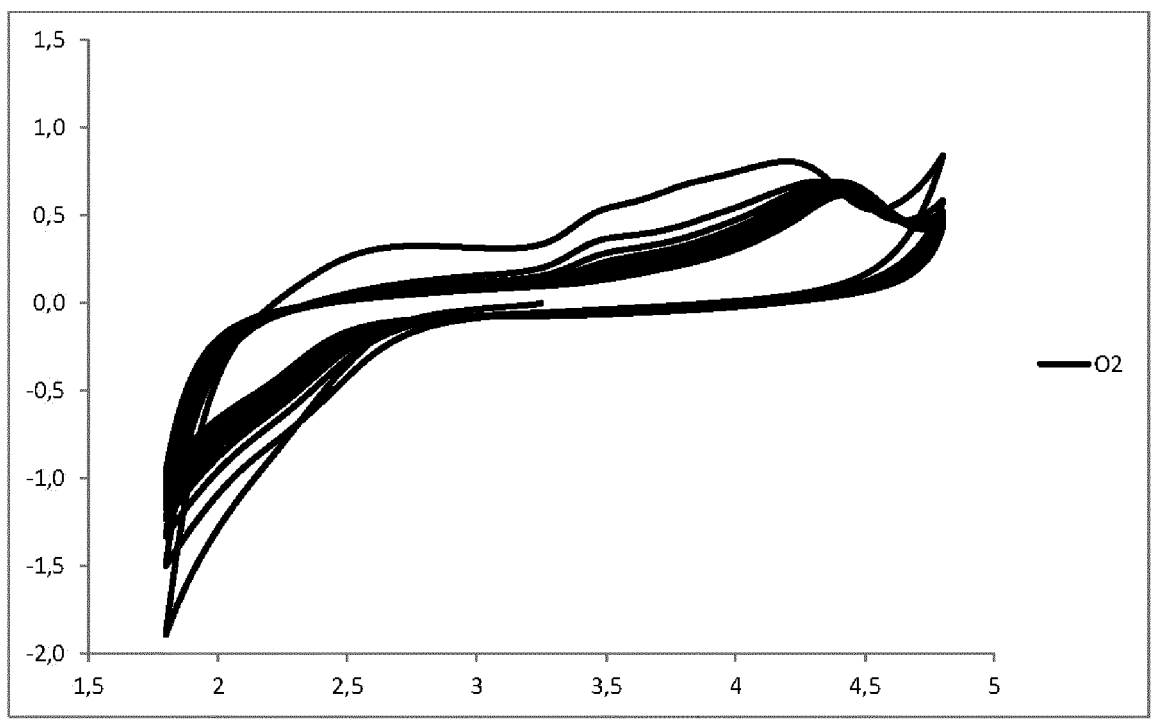
FIGS. 11A and 11B are graphs representing the current density as a function of voltage respectively for a non pre-conditioned 3D nanomesh structure and for Example 3.
Figure 11B:
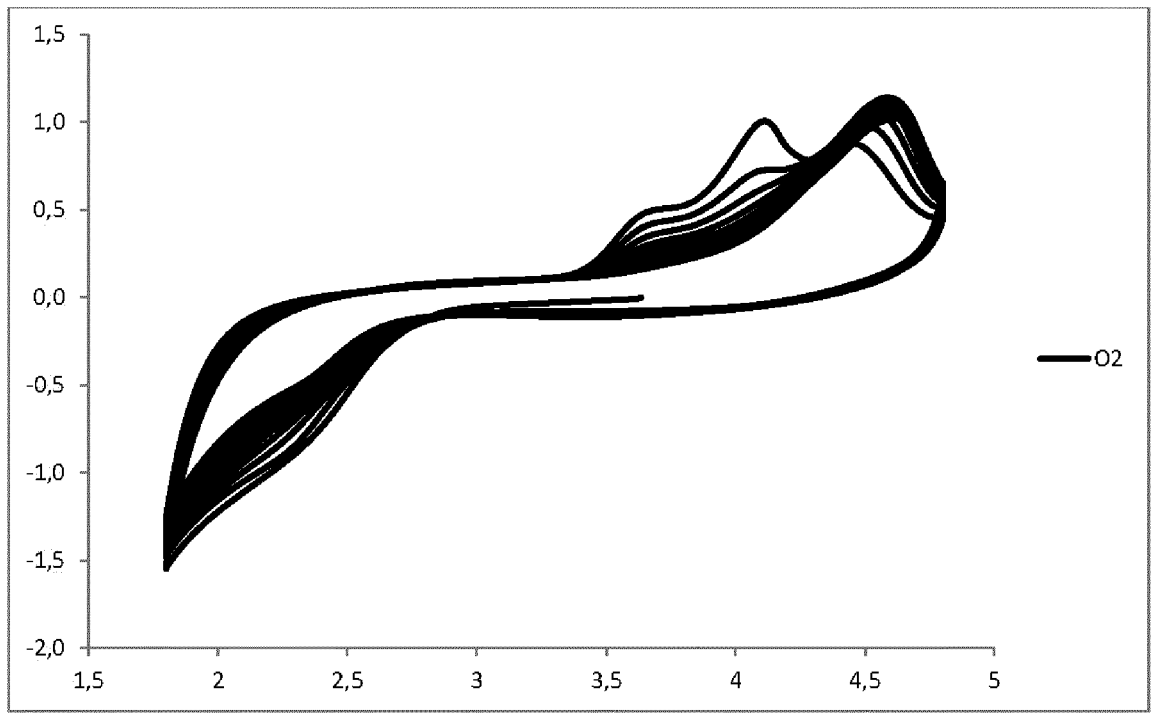

The feasibility of dried Ni nanomesh in 0.5M LiTFSI/DME without $N_2$ pre-cycling is also tested and compared with that of non-dried Ni nanomesh without the formation step under $N_2$ (step 110) as illustrated in FIGS. 11A and 11B. In the first few cycles, high current density is observed from both samples which is then gradually decreased upon cycling. The convergence condition (>1 µAh $cm^{-2}$) could be reached after more than 10 cycles, which may be related to the surface passivation and cleaning. Therefore, we do not further investigate the samples without pre-cycling in this report.

Cyclic voltammograms for 0.5 M LiTFSI in DME testing cell in $O_2$ are shown respectively at FIGS. 11A and 11B for pristine 3D nanomesh structure and the pre-conditioned 3D nanomesh structure 26 obtained with a drying step 104 and no formation step 110. In FIGS. 11A and 11B the y-axis represents the current density expressed in mA $cm^{-2}$ and the x-axis represents the voltage vs. Li+/Li expressed in V.

Example 4—3 D Nickel Nanomesh with Coating and Formation Steps

Example 4 is processed as Example 1. An additional pre-conditioning step is performed, which is a conformal coating of the 3D nanomesh structure before insertion of the cathode 20 in the battery 10.

The 3D nanomesh structure is coated with amorphous carbon, the amorphous carbon coating having a thickness smaller than or equal to 2 nm.

By way of example, the amorphous carbon coating may be deposited by PECVD (Plasma Enhanced Chemical Vapour Deposition).

The pristine (non pre-conditioned) 3D nanomesh structure is transferred to the PECVD (Oxford) for carbon treatment. For the carbon treatment, the inner chamber is pre-heated to 250° C. for 5-20 min while the dried Ni nanomesh is vacuumed at the pressure of $10^{-5}$ mbar in the outer chamber. The sample is then transferred to inner chamber where it is kept at 250° C. for 1 to 10 min under 50-200 W plasma under flow of gas mixture of $H_2$, Ar and $NH_3$ at summed rate greater than or equal to 50 mL $min^{-1}$, for example, greater than or equal to 200 mL $min^{-1}$. Specifically, the flow rate of 100:50:50 mL $min^{-1}$ of $H_2$, Ar and $NH_3$ is selected for this study. The plasma is then turned off before the injection of a gas mixture of $H_2$, Ar, $NH_3$ and $C_2H_2$ is initiated. Here, the use of plasma is optional and used to prevent temperature gradient of bottom and top parts of the 3D nanomesh structure or to reduce the formation of a surface passivated layer, such as NiO. The $H_2$, Ar, $NH_3$, $C_2H_2$ gases are purged into the inner chamber at a summed flow rate between 50 mL $min^{-1}$ and 250 mL $min^{-1}$ to allow growth of thin amorphous carbon layer on the surface of Ni nanomesh. Here, the flow ratio between supporting gases such as H2 and NH3 and carbon source C2H2 is greater than or equal to 1:1, for example, greater than or equal to 4:1 to prevent overgrowth of amorphous carbon on 3D nickel nanomesh structure and accumulation of carbon remnant in the inner chamber. The carbon treated Ni nanomesh (CNM) is transferred to $N_2$-filled glovebox and washed twice with DME to remove possible carbonaceous contaminants from PECVD.

Figure 12:
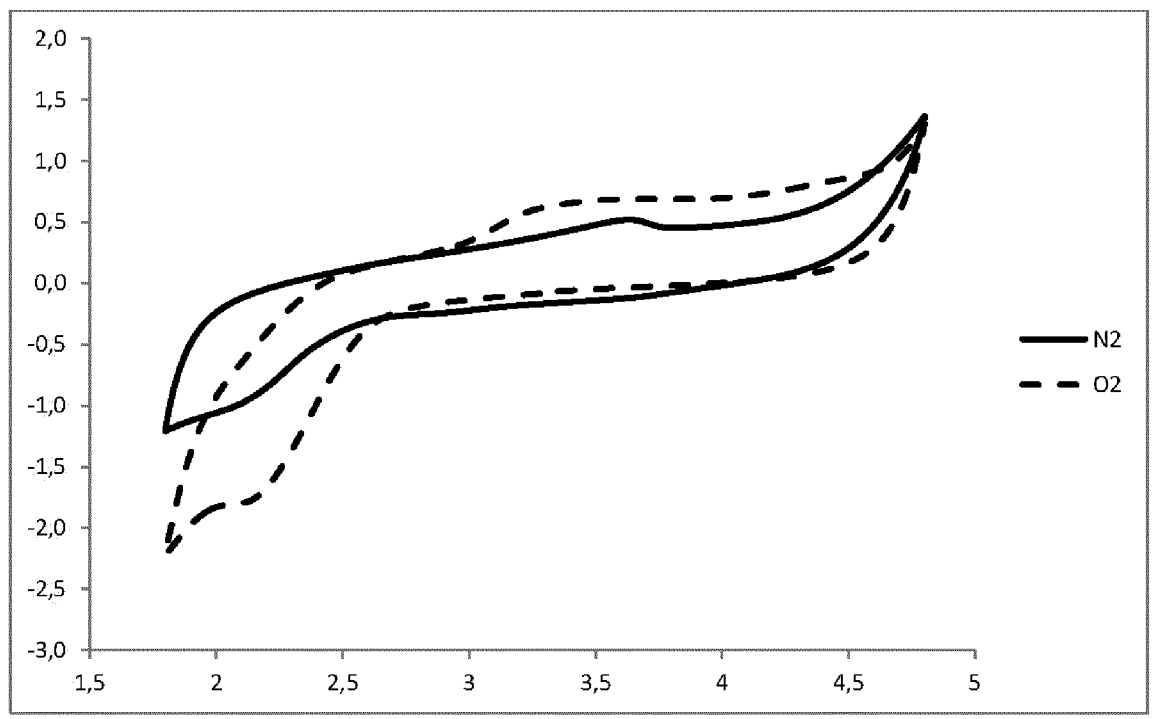
FIG. 12 is a graph representing the current density as a function of voltage for Example 4.

Cyclic voltammogram for 0.5 M LiTFSI in DME testing cell is shown at FIG. 12. In FIG. 12 the y-axis represents the current density expressed in mA $cm^{-2}$ and the x-axis represents the voltage vs. $Li^+$/Li expressed in V.

In FIG. 12, the cycle plotted for $N_2$ is the fifteenth cycle, while the cycle plotted for $O_2$ is the third cycle.

The calculated charge density ($C_{O2}$-$C_{N2}$) for DME-CNM is −29.91 mC $cm^{-2}$ for reduction reaction and 8.93 mC $cm^{-2}$ for oxidation reaction. The increased reductive charge density is attributable to the increase of reductive current density centered at 2.2 V vs. $Li^+$/Li, while heavily decreased oxidative current density at 4.5 V vs. $Li^+$/Li results in the relatively low oxidative charge density compare to that of DME-DNM.

In fact, this behavior is in good agreement with other carbonaceous electrode such as glassy carbon as depicted in FIG. 12, which indicates that carbon treatment is successful using CVD system under relatively low temperature.

Figure 13:
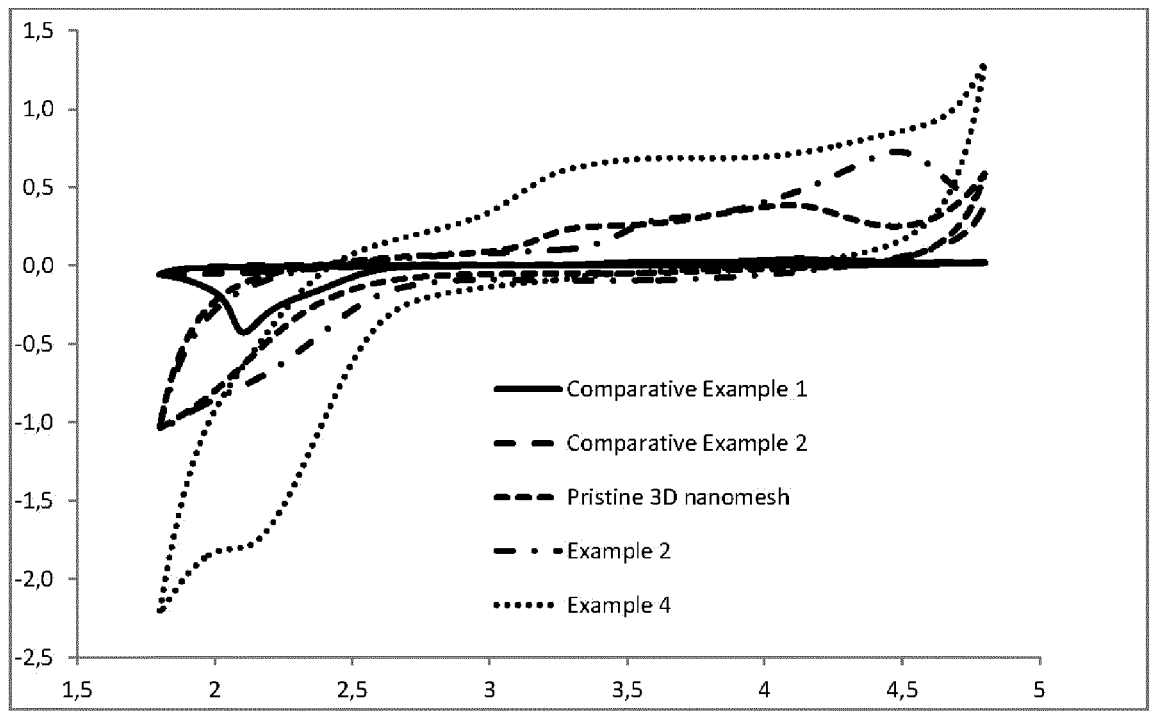
FIG. 13 is a graph representing the current density as a function of voltage for Comparative Example 1-Example 4.

As shown at FIG. 13, cycles obtained for Comparative Example 1, Comparative Example 2, pristine 3d nanomesh, Example 2 and Example 4 are plotted. In FIG. 13 the y-axis represents the current density expressed in mA $cm^{-2}$ and the x-axis represents the voltage vs. Li+/Li expressed in V. In FIG. 13, the cycle plotted for $O_2$ is the third cycle.

We can clearly see the improvement in terms of current density obtained at a given rate (25 mV/sec) of the pre-conditioned 3D nanomesh structure 26.

Figure 16:
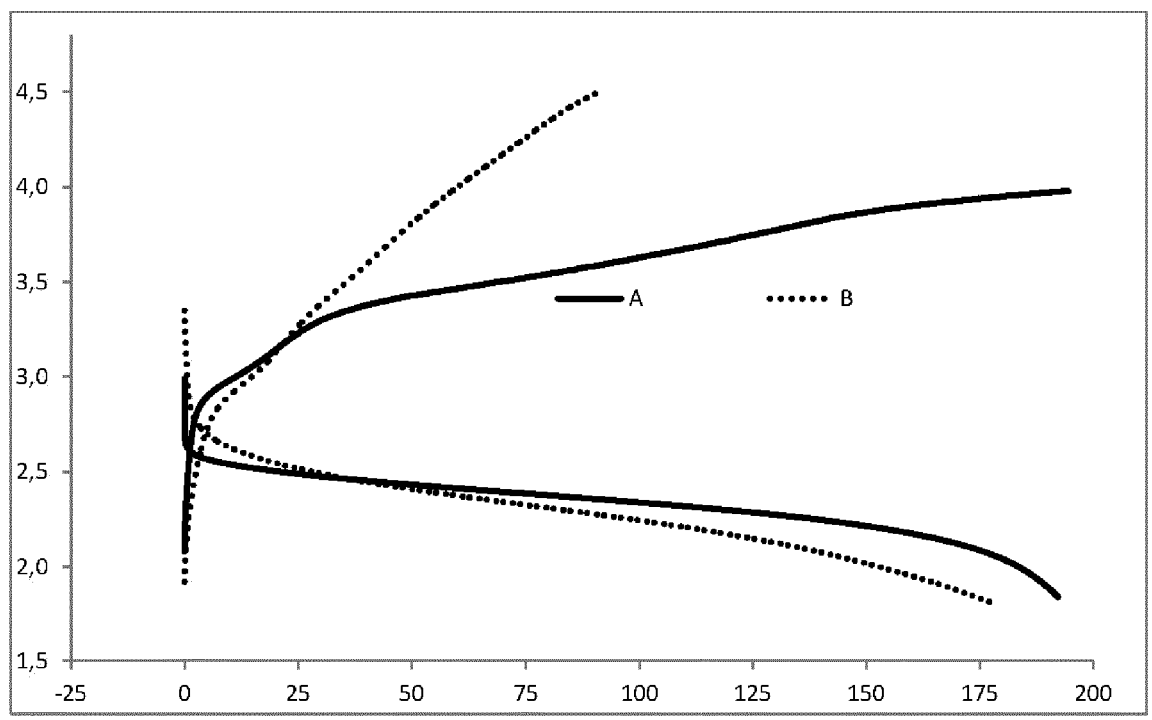
FIG. 16 is a graph representing voltage as a function of the areal capacity of Example 4 for two different oxidative current rate.

To further investigate feasibility of dried Ni nanomesh (DNM) and carbon-treated Ni nanomesh (CNM) as possible candidates for Li—$O_2$ battery electrodes, the galvanostatic charge and discharge measurements have been carried out on glassy carbon, dried Ni nanomesh and carbon-treated Ni nanomesh between the voltage range of 1.8 and 4.5 V (vs. $Li^+$/Li) at a current rate of 0.1 mA $cm^{-2}$. The obtained curves and respective areal capacity of each sample are compared and illustrated in FIG. 14. Note that pre-cycling under N2 was applied on all samples represented on FIG. 14. Here, the obtained areal capacity for dried Ni nanomesh is 23.78 μAh $cm^{-2}$ for discharging and 23.64 μAh $cm^{-2}$ for charging, respectively, with the coulombic efficiency of 99.4%. These values are 23.1 and 56.7 times higher than those of glassy carbon. On the other hand, carbon-treated Ni nanomesh (CNM) shows the highest areal capacity of 178.61 μAh $cm^{-2}$ for discharging and 91.11 μAh $cm^{-2}$ for charging with the coulombic efficiency of 51%. The balanced oxidative current flow of 0.05 mA $cm^{-2}$ is applied further to understand better cycle performance of CNM as shown in FIG. 16. There, the reductive current flow of 0.1 mA $cm^{-2}$ is used which is the same as CNM in FIG. 14. Another difference between CNM used in FIG. 16 and FIG. 14 is that the galvanostatic charge and discharge of CNM in FIG. 16 is recorded without pre-cycling, i.e., the formation step 110. As shown, the observed specific capacity of 192 μAh $cm^{-2}$ is preserved upon oxidation (4.0 V) with 100% efficiency, which shows that the better utilization could be made with the balanced current flow. In addition, there is only small difference in capacity regardless if the pre-cycling is carried out or not.

Here, the reasons for observed improvement of dried Ni nanomesh are 2-fold: i) surface area enhancement; ii) thermal dehydration of pristine Ni nanomesh, resulting in increased current density of $2^{nd}$ peak centered at 4.5 V vs. $Li^+$/Li.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for making a non-aqueous rechargeable metal-air battery, comprising:
    making a cathode comprising a 3D nanomesh structure comprising nanowires made of electronic conductive metal material;
    inserting the cathode in the battery;
    charging/discharging the battery so as to form the cathode active material on a pre-conditioned 3D nanomesh structure;

wherein, before inserting the cathode in the battery, a pre-conditioning step comprising a coating step of the 3D nanomesh structure, the coating step is carried out to at least partially remove, transform, or deactivate hydroxyl groups on the 3D nanomesh structure, so as to obtain the pre-conditioned 3D nanomesh structure, the pre-conditioned 3D nanomesh structure being free of cathode active material, and wherein the coating step includes conformably coating the 3D nanomesh structure with amorphous carbon, the amorphous carbon coating having a thickness smaller than or equal to 2 nm.

2. The method according to claim 1, wherein the pre-conditioning step comprises a drying step to the 3D nanomesh structure.

3. The method according to claim 2, wherein the drying step is carried out in air for at least 1 h at a temperature greater than or equal to 100° C.

4. The method according to claim 3, wherein the temperature is smaller than or equal to 300° C.

5. The method according to claim 1, wherein the conformably coating step is carried out at a temperature smaller than or equal to 300° C.

6. The method according to claim 1, wherein the conformably coating step is carried out by chemical vapor deposition or plasma enhanced chemical vapor deposition.

7. A cathode to be inserted into a non-aqueous rechargeable metal-air battery, the cathode comprising a pre-conditioned 3D nanomesh structure made of nanowires made of electronic conductive metal material, the pre-conditioned 3D nanomesh structure being free of cathode active material, wherein the cathode comprises a plurality of pre-conditioned 3D nanomesh structures disposed in series, the cathode also including at least a gas diffusion layer disposed between two adjacent pre-conditioned 3D nanomesh structures, and wherein the pre-conditioned 3D nanomesh structure is conformably coated with an amorphous carbon coating, and the amorphous carbon coating has a thickness of less than or equal to 2 nm.

8. The cathode according to claim 7, wherein the nanowires have a diameter smaller than or equal to 500 nm and an aspect ratio greater than or equal to 20.

9. The cathode according to claim 8, wherein the spacing between the longitudinal axis of two neighboring nanowires is greater than or equal to 20 nm and smaller than or equal to 600 nm, the spacing being larger than the diameter of the nanowires.

10. The cathode according to claim 7, wherein the pre-conditioned 3D nanomesh structure has a thickness greater than or equal to 1 µm and smaller than or equal to 500 µm.

11. The cathode according to claim 7, wherein the pre-conditioned 3D nanomesh structure has a volumetric surface area greater than or equal to 20 $m^2/cm^3$ and a porosity greater than or equal to 50 vol % and smaller than or equal to 90 vol %.

12. The cathode according to claim 7, wherein the electronic conductive metal material is nickel, cobalt, gold, palladium, platinum, copper, titanium or aluminium or a mixture thereof.

13. A non-aqueous rechargeable metal-air battery comprising a cathode according to claim 7.

14. The non-aqueous rechargeable metal-air battery according to claim 13, comprising a non-aqueous electrolyte, wherein the non-aqueous electrolyte is free of carbonate group.

15. The non-aqueous rechargeable metal-air battery according to claim 13, wherein the metal-air battery is a lithium-air battery.

* * * * *